(12) United States Patent
Ahmed et al.

(10) Patent No.: US 8,144,708 B1
(45) Date of Patent: Mar. 27, 2012

(54) COLLABORATIVE MULTICAST ROUTING (CMR) FOR MULTICASTING IN UNIDIRECTIONAL, HYBRID, MULTI-TIERED MOBILE WIRELESS NETWORK

(75) Inventors: Mohiuddin Ahmed, Moorpark, CA (US); Son Dao, Northridge, CA (US); Noparut Vanitchanant, Irving, TX (US)

(73) Assignee: HRL Laboratories, LLC, Malibu, CA (US)

( * ) Notice: Subject to any disclaimer, the term of this patent is extended or adjusted under 35 U.S.C. 154(b) by 8 days.

(21) Appl. No.: 12/592,687

(22) Filed: Nov. 30, 2009

Related U.S. Application Data

(62) Division of application No. 11/002,879, filed on Dec. 1, 2004, now Pat. No. 7,649,884.

(51) Int. Cl.
   *H04L 12/28* (2006.01)
(52) U.S. Cl. .......................... 370/390; 370/389; 370/392
(58) Field of Classification Search .......................... None
   See application file for complete search history.

(56) References Cited

U.S. PATENT DOCUMENTS

| | | | | |
|---|---|---|---|---|
| 5,959,989 A * | 9/1999 | Gleeson et al. | ............... | 370/390 |
| 6,252,856 B1 * | 6/2001 | Zhang | ........................... | 370/254 |
| 6,353,596 B1 * | 3/2002 | Grossglauser et al. | ....... | 370/256 |
| 6,507,562 B1 * | 1/2003 | Kadansky et al. | ............ | 370/216 |
| 6,839,348 B2 * | 1/2005 | Tang et al. | .................... | 370/390 |
| 7,016,351 B1 * | 3/2006 | Farinacci et al. | ............. | 370/392 |
| 7,031,308 B2 * | 4/2006 | Garcia-Luna-Aceves et al. | ............................. | 370/390 |
| 7,061,880 B2 * | 6/2006 | Basilier | ......................... | 370/312 |
| 7,333,486 B2 * | 2/2008 | Novaes | ......................... | 370/390 |
| 7,720,019 B1 * | 5/2010 | Farinacci et al. | ............. | 370/312 |
| 2002/0150094 A1 * | 10/2002 | Cheng et al. | .................. | 370/389 |
| 2005/0243722 A1 * | 11/2005 | Liu et al. | ....................... | 370/235 |
| 2006/0203819 A1 * | 9/2006 | Farinacci et al. | ............. | 370/390 |

OTHER PUBLICATIONS

D. Payton, et al., "Dynamic Collaborator Discovery in Information Intensive Environments," ACM 1999.

I. Stoica, et al., "Reunite: A Recursive Unicast Approach to Multicast," IEEE INFOCOM 2000.

L. Costa, et al., "Hop by Hop Multicast Routing Protocol," SIGCOMM 2001, San Diego, CA.

* cited by examiner

*Primary Examiner* — Michael J Moore, Jr.
(74) *Attorney, Agent, or Firm* — Tope-McKay & Assoc.

(57) ABSTRACT

The present invention provides a scalable and reliable collaborative multicast routing for multicasting in hybrid, multi-tiered, mobile heterogeneous wireless networks. It establishes a multicast tree, maintains the established route, detects and prevents most link breakage within the multicast tree by a neighboring node or the cooperation of the neighboring node, and enables merging of partitioned multicast trees of the same multicast group by nodes that participate in one of the partitioned multicast trees. The use of local nodes to collaboratively establish, maintain, recover, and merge the hybrid, multi-tiered mobile wireless networks that use heterogeneous set of mobile wireless nodes is the fundamental basis for the collaborative multicast routing scheme of the present invention.

17 Claims, 13 Drawing Sheets

| GENERIC CONTROL PACKET | |
|---|---|
| PARAMETER | SETTINGS |
| Mode: | |
| Multicast Group ID | |
| Root | |
| Originator | |
| Forwarder | |
| Routing Table: | |
| FORWARD NODE LIST | |
| BACKWARD NODE LIST | |
| Reconstruction Path Flag | |
| Forwarding Flag | |
| Receptive-Inbound | |
| Receptive-Outbound | |
| ⋮ | ⋮ |
| OTHERS | |

410

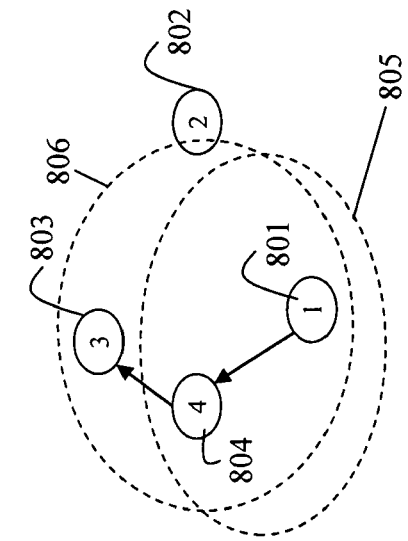
FIG. 8B
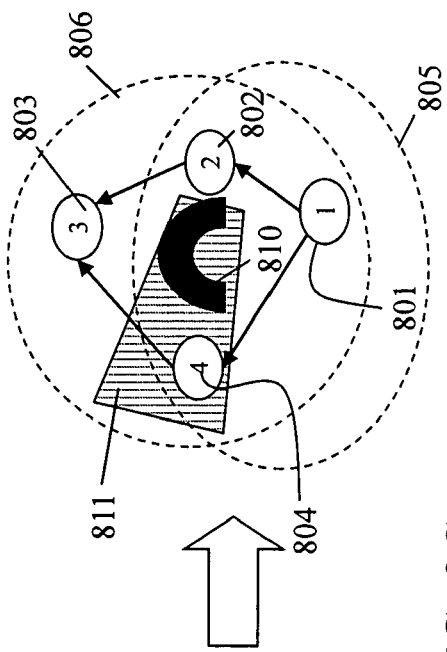
FIG. 8C
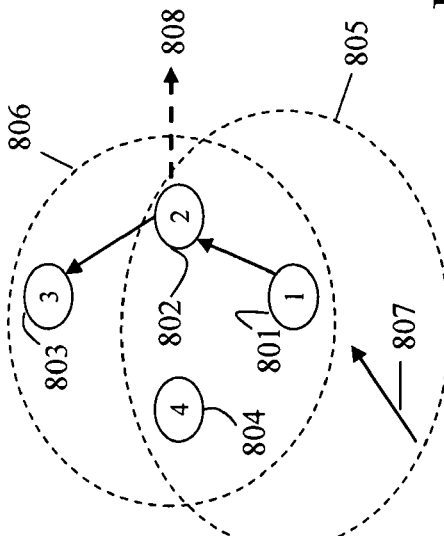

COLLABORATIVE MULTICAST ROUTING (CMR) FOR MULTICASTING IN UNIDIRECTIONAL, HYBRID, MULTI-TIERED MOBILE WIRELESS NETWORK

CROSS-REFERENCE TO RELATED APPLICATIONS

This divisional application claims the benefit of priority to U.S. Utility application Ser. No. 11/002,879, filed in the United States on Dec. 1, 2004, entitled "COLLABORATIVE MULTICAST ROUTING (CMR) FOR MULTICASTING IN UNIDIRECTIONAL, HYBRID, MULTI-TIERED MOBILE WIRELESS NETWORK."

STATEMENT REGARDING FEDERALLY SPONSORED RESEARCH OR DEVELOPMENT

This invention relates to work performed in contract with the U.S. Government under DARPA NGI, Contract N00014-404-C-0322, and the U.S. Government may have certain rights in this invention.

BACKGROUND OF THE INVENTION (1) Field of the Invention

This invention relates to mobile wireless communications and, more particularly, to a collaborative multicast routing (CMR) for multicasting in a hybrid, multi-tiered, heterogeneous mobile wireless network.

(2) Description of Related Art

The prior art Dynamic Source Routing (DSR) and Multicast Ad-hoc On-demand Distance Vector Protocol (MAODV) are two exemplary protocols used in a multicast environment. The multicast protocols for wireless networks fundamentally consist of route discovery and route maintenance phases. The prior art Dynamic Source Routing (DSR) protocol is not a multicasting protocol per se, but is a unicast routing protocol designed for bi-directional links that allows nodes to dynamically discover a source route across the network. DSR uses source-directed routing to specify which intermediate node is to be part of the route and establishes paths by recording all the nodes along a critical path. Each data packet sent carries in its header the complete, ordered list of nodes through which the packet must travel. In order to support unidirectional links, a receiver node in a DSR protocol forwards another route request piggybacked to its route reply in response to the received route request. Therefore, it takes one and a half round trips to establish a route using the DSR protocol.

The prior art Multicast Ad-hoc On-demand Distance Vector Protocol (MAODV) is a true multicast protocol, but designed for multicast routing in bi-directional mobile wireless networks. MAODV is a group-leader rooted, tree-based, on-demand routing protocol, which uses soft-state mechanism in a routing table. The route discovery phase of this protocol commences by a group leader broadcasting out a route request control packet (RREQ) across the entire network using an expanding ring search technique. When a node determines that it has a route current enough to respond to the RREQ or be a member itself, the node creates a route reply control packet (RREP) and unicasts the RREP toward the source, using the node from which it received the RREQ as the next hop. After receiving RREPs, the group-leader node selects the route it wishes to use as its link to the multicast tree. This is accomplished by the group-leader node unicasting a Multicast Activation (MACT) packet out to the selected next hop(s) (or nodes), effectively activating the route. When a selected next hop (node) receives a MACT from the group-leader that has selected it as the next hop, this next node unicasts its own MACT to the node(s) it has chosen as its next hop(s), and so on up the multicast tree, until a node which was already a part of the multicast tree is reached. Every node constructs and maintains its own multicast routing table, which contains both its neighbor nodes and its multicast neighbor nodes, generating a large overhead of stored data.

The route maintenance phase of MAODV uses Group Hello (GRPH) message under normal circumstances to maintain a route and RREQ-RREP message for repairing a broken link. To maintain a route under normal circumstances, the group-leader forwards a GRPH message to all nodes within its multicast group. This enables all nodes within the group to maintain consistent and up-to-date information about the group-leader and the multicast group route. To maintain route under circumstances such as a detection of a broken link between two nodes on a multicast route, the node downstream of the break becomes responsible for initiating the repair of the broken link. Of course, it is possible that after a link breaks, the multicast tree cannot be repaired due to a network partition. The group leader node can start up a new multicast tree in a network partition. In order to connect the two parts of the partitioned network as they roam into each other, the group leader of one of the partitions with a lower Internet Protocol (IP) address, upon receiving another partition's packets, initiates the multicast tree repair by unicasting a RREQ to the group leader of the other network partition, where the RREQ-PREP process starts again. It should be noted that only a group leader itself must receive packets from another partition to commence a merging process of the partitioned network.

In light of the current state of the art and the drawbacks to current systems mentioned above, as well as the explosive growth of the Internet and the mobile wireless devices, a need exists for a system and a method that would allow transmission of only a single data stream with few or no replications, that would have small overhead when tracking a path for construction and maintenance of a multicast tree route, and that would work on a hybrid, multi-tiered network with heterogeneous set of nodes. In addition, in order to merge two partitioned multicast groups, a need exists for a system that would not require the group-leader node to come into contact with a node from another partition to commence a merge process and furthermore, the system would not use expanding ring search for the route discovery phase, which in terms of resources is very costly.

BRIEF SUMMARY OF THE INVENTION

The present invention provides a collaborative multicast routing (CMR) technique that enables reliable and fault-tolerant multicasting with few or no replications of a message with small overhead for tracking a path for construction and maintenance of a multicast route. The present invention provides the ability to form a dynamic multicasting network tree structure, using hybrid, multi-tiered network system with heterogeneous set of wireless nodes where unidirectional links may exist. In addition, the present invention enables non-group-leader node of a multicast group to commence merge processing for a partitioned multicast tree. The present invention employs a routing collaboration schemes whereby neighboring nodes (i.e. nodes that are fully receptive of local transmission flow, but not on forwarding duty) are capable of taking over the forwarding role of a message as dictated in the protocol.

One aspect of the present invention provides a method for collaborative multicast routing among a set of nodes, including nodes acting as a root node, intermediate nodes, and member nodes, comprising establishing a multicast tree by: transmitting an advertisement message from the root node to other nodes in the set of nodes, including a forward path track; receiving a message at a receiving node among the set of nodes; determining a type for the action of receiving node, and if: the receiving node is acting as a group member node: determining whether the message is an advertisement message, and if the message is an advertisement message, transmitting a reply message including a backward path track; otherwise wait; the receiving node is acting as an intermediate node: determining whether the message is an advertisement message, and if the message is an advertisement message, appending an address of the receiving node to the forward path track and transmitting an advertisement message including the updated forward path track; otherwise: if the message is a reply message, appending an address of the receiving node to the backward path track and transmitting a reply message including the updated backward path track; and the receiving node is acting as a root node: determining whether the message is an advertisement message, and if the message is an advertisement message, wait; if the message is a reply message, appending an address of the receiving node to the backward path track.

Another aspect of the present invention provides the act of transmitting the advertisement message. Only one advertisement message is transmitted from the root node for establishing one multicast tree and is replicated as needed in the network to reach the member nodes.

Yet another aspect of the present invention is that the root node is part of a satellite network.

Still another aspect is that the multicast tree is formed dynamically with heterogeneous wireless nodes.

A further aspect is that the heterogeneous wireless nodes are comprised of unidirectional and bi-directional nodes.

A still further aspect is that the hybrid wireless nodes are comprised of both satellite and land based nodes.

Yet a further aspect is that the multicast tree is established when all nodes along the forward route of the advertisement message and all nodes along the backward route of the reply message are determined.

Yet still a further aspect is that the determination of all nodes along both forward and backward directions is accomplished in a single round trip path from the root node to the member nodes and back to the root node.

Another aspect is that only non-duplicate node addresses, using sequence numbers, appear on the forward path track and the backward path track for each direction to avoid loop formation.

A further aspect is that nodes have different delay settings to rebroadcast their messages.

Still a further aspect is that the multicast tree is established using a GPS-capable add-on device to reduce flooding coverage area and to reduce network traffic overhead.

Yet a further aspect is that each established multicast tree has a unique identification associated therewith.

Another aspect of the present invention provides a method for collaborative multicast routing among a set of nodes, including a root node, intermediate nodes, and member nodes, comprising maintaining a multicast tree by: receiving a message including a path having a plurality of addresses of nodes along the path, at a receiving node in the set of nodes; determining whether the message is a data message, and: if the message is a data message, then determining a type for the action of the receiving node, and if: the receiving node is acting as a member node, awaiting the receipt of another message, waiting to overhear a message from the next node along the path, and performing an eavesdropping operation by: when a message from the next node along the path is overheard before expiration of the entry timer, updating an entry timer and waiting to overhear a message from the next node along the path; and when no message is received before expiration of the entry timer, replace an address of the next node along the path with an address of the receiving node and transmit a reconstruction message and the data message to be forwarded to other nodes in the network and refreshing an entry timer; and the receiving node is acting as an intermediate node, forwarding the message and adjusting the path; otherwise determining whether the message is a reconstruction message, and: if the message is a reconstruction message, determining a type for the action of the receiving node, and: if the node is acting as a node selected from a group consisting of member node and a root node, transmitting an updated refresh message for receipt by neighboring nodes; and if the node is acting as an intermediate node along a path indicated by an address track, forwarding the message; otherwise determining a type for the action of receiving node and whether the receiving node is next along the path, and if: the node is acting as an intermediate node and is next along the path, forwarding the message and adjusting the path; the node is acting in a manner selected from a group consisting of as an intermediate node and a member node and is not next along the path then updating an entry timer at the receiving node and performing an eavesdropping operation; and otherwise doing nothing.

Yet another aspect of the present invention is that nodes are categorized into active nodes and inactive neighbor nodes.

A further aspect of the present invention is that the active nodes are on a critical path between the root node and the member node, and are on a forwarding duty.

Still a further aspect of the present invention is that the inactive neighbor nodes that are fully receptive of other active node message flows, but not on forwarding duty, can take over forwarding duty if required.

Another aspect that the present invention provides is that when the inactive neighbor node fails to hear a message from other nodes within a time limit, the inactive neighbor node assumes a change in the local circumstances.

Yet another aspect that the present invention provides is that the change in the local circumstances includes a moving of an active node out of the broadcast range of the inactive neighbor node causing the inactive neighbor node to take over forwarding duty of the active node.

Still another aspect that the present invention provides is that the changes in the local circumstances include an existence of a terrain blockage, where an inactive neighbor node is unable to receive from the active node, causing the inactive neighbor node to take over forwarding duty of the active node.

Another aspect that the present invention provides a method for collaborative multicast routing among a set of nodes, including a root node, intermediate nodes, and member nodes, comprising recovering a multicast tree by: expiring an entry timer at a receiving node after awaiting a message selected from a group consisting of a refresh message and a data message; determining whether an advertisement message has been received, and: if an advertisement message having a forward path track has been received, determining a type for the action of the receiving node, and: if the receiving node is acting as a member node, transmitting a reply message having a backward path track to neighboring nodes, to be forwarded toward a node acting as a root node to generate a complete backward path track; and if the receiving node is acting as an intermediate node, appending an address of the receiving node to the forward path track and transmitting an advertisement message including the updated forward path track toward a node acting as a member node, and determining whether a reply message has been received, and: if a reply message having a backward path track has been received, determining a type for the action of the receiving node, and: if the node is acting as an intermediate node, appending an address of the receiving node to the backward path track and transmitting a reply message including the updated backward path track; and if the node is a root node, appending an address of the receiving node to the backward path track; and determining whether a transmitting message selected from a group consisting of the advertisement message and the replay message has been transmitted by the receiving node, and, if the transmitting message has been transmitted, then the receiving node is no longer a member of the set of nodes for the collaborative multicast routing; and if the transmitting message has not been transmitted, determining whether a last message received by a receiving node was in the forward direction, and, if the last message received was in the forward direction, determining a type for the action of the receiving node, and: if the receiving node is acting as the member node, propagating a repair message to the root node, and awaiting the advertisement message, and if the last message received was not in the forward direction, determining whether the receiving node is a root node, and, if the receiving node is the root node, commencing route establishment process; and if the receiving node is not the root node, forwarding any received message.

Another aspect that the present invention provides is that the route establishment process, comprises: transmitting an advertisement message from the root node to other nodes in the set of nodes, including a forward path track; receiving a message at a receiving node among the set of nodes; determining a type for the action of receiving node, and if: the receiving node is acting as a group member node: determining whether the message is an advertisement message, and if the message is an advertisement message, transmitting a reply message including a backward path track; otherwise waiting; and the receiving node is acting as an intermediate node: determining whether the message is an advertisement message, and if the message is an advertisement message, appending an address of the receiving node to the forward path track and transmitting an advertisement message including the updated forward path track; otherwise: if the message is a reply message, appending an address of the receiving node to the backward path track and transmitting a reply message including the updated backward path track; and the receiving node is acting as a root node: determining whether the message is an advertisement message, and if the message is an advertisement message, waiting; and if the message is a reply message, appending an address of the receiving node to the backward path track.

Another aspect that the present invention provides is a method for collaborative multicast routing among a set of nodes, including nodes acting as the root node, intermediate nodes, and member nodes, comprising merging at least two partitions of a multicast tree into one larger partition by: receiving identical messages from at least two separate root nodes that include at least two paths having a plurality of addresses of nodes along each path at a receiving node in the set of nodes; selecting a root node of a partition at the receiving node; determining if the receiving node participates in a partitioned multicast tree; if the receiving node does not participant in the partitioned multicast tree, the receiving node waiting; if the receiving node is a participant in the partitioned multicast tree, determining a type for an action of receiving node, and if: the receiving node is acting as a group member node: the receiving node performs a pre-merging, a reply, and a to-advertisement processes; otherwise if the receiving node is acting as an intermediate node: the receiving node performs a pre-merging and to-advertisement processes, and transmits a modified message; where the pre-merging process comprises: modifying a node list in the receiving message; if the receiving message is in a forward path, removing all nodes ordered before the originator node address in a forwarding node list; setting a backward node list to null; otherwise, if the receiving message is in a backward path, removing all the nodes ordered before the originator node address and the originator node address in the backward node list; appending the remaining backward node list to the forward node list; and setting backward node list to null; and where the reply process comprises: modifying the message received into a reply message; placing the receiving node address in the backward node list; and transmitting the reply message; and where the to-advertisement process comprises: modifying the message received into an advertisement message; selecting the root node; appending receiving node address into the forwarding node list; and transmitting the advertisement message.

Another aspect that the present invention provides is a method for collaborative multicast routing among a set of nodes, including nodes acting as a root node, intermediate nodes, and member nodes, comprising merging at least two partitions of a multicast tree into one larger partition by: receiving identical messages from at least two separate root nodes that include at least two paths having addresses of nodes along each path at a receiving node in the set of nodes; selecting a root node of a partition at the receiving node; determining if the receiving node participates in a partitioned multicast tree; if the receiving node is not a participant in the partitioned multicast tree, the receiving node waiting; if the receiving node is a participant in the partitioned multicast tree, determining a type for an action of receiving node: if the receiving node is acting as a group member node: the receiving node performing a pre-merging process, comprising: modifying a node list in the received message; if the receiving message is in a forward path, removing all nodes ordered before the originator node address in a forwarding node list; setting a backward node list to null; otherwise, if the receiving message is in a backward path, removing all the nodes ordered before the originator node address and the originator node address in the backward node list; appending the remaining backward node list into the forward node list; and setting backward node list to null; the receiving node performing a reply process, comprising: modifying the message received into a reply message; placing the receiving node address in the backward node list; and transmitting the reply message; and the receiving node performing a to-advertisement process, comprising: modifying the message received into the to-advertisement message; selecting the root node; appending receiving node address into the forwarding node list; transmitting the advertisement message; if the receiving node is acting as an intermediate node, the receiving node performs the pre-merging and the to-advertisement processes.

Another aspect that the present invention provides is that the reply process, comprises: the receiver member node copying the received message and changing the received message to a reply message; the receiver member node placing the address of the receiving member node in the backward node list, and broadcasting the reply message.

Another aspect that the present invention provides is a method for collaborative multicast routing, comprising: multicasting in a hybrid, multi-tiered, heterogeneous mobile wireless network using a control packet to uniformly manage multicasting operations; establishing a multicast route; maintaining the multicast route; if it is determined that a link is severed within the multicast route, recovering the severed link-using local communication units; and if it is determined that a partition has occurred in a multicast group, merging partitioned multicast trees of the multicast group using local communication units.

Another aspect that the present invention provides is that the hybrid, multi-tiered, heterogeneous mobile wireless network comprises both satellite and land based communication units.

Another aspect that the present invention provides is establishing the multicast route completed in a single round trip path of the control packet traversing in a forward direction from a source to a destination and in a backward direction from a destination to source.

Yet another aspect that the present invention provides is maintaining the multicast route by a source communication unit forwarding the control packet to all destination communication units to maintain active status.

Still another aspect that the present invention provides is recovering of the multicast tree with broken links by local communication units using the control packet.

A further aspect that the present invention provides is the merging of the multiple multicast tree partitions of a multicast group into a larger multicast tree done by local communication units using the control packet.

Another aspect that the present invention provides is the control packet comprising: a mode parameter for identifying a purpose of the packet; a multicast group identification parameter for allowing the communication unit to determine if the communication unit belongs to the multicast group; a source parameter for identifying the source; an Originator parameter for identifying the originator of the packet; a Forwarder parameter for identifying the forwarder of the packet; a Routing Table, comprising a FORWARD NODE LIST for identifying the communication units traversed by the control packet along the forward direction from the source to destination, and a BACKWARD NODE LIST for identifying the communication units traversed by the control packet along the backward direction from the destination to the source; a Reconstructed Flag parameter for identifying if the path established has been reconstructed; a Forwarding Flag parameter for determining if a packet should be forwarded; a Receptive-Inbound parameter for identifying transmission of a signal from the communication unit; and a Receptive-Outbound parameter for identifying the reception of a signal from the communication unit.

Still another aspect that the present invention provides is the mode parameter that may be set to one of an ADVERTISEMENT, a REPLY, a REFRESH, and a REPAIR modes.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Referring to the drawings in which like reference character(s) present corresponding parts throughout:

FIGS. 8A to 8E are exemplary illustrations of different topographies of clusters of nodes for exemplary circumstance changes in accordance with the present invention;

Figure 1:
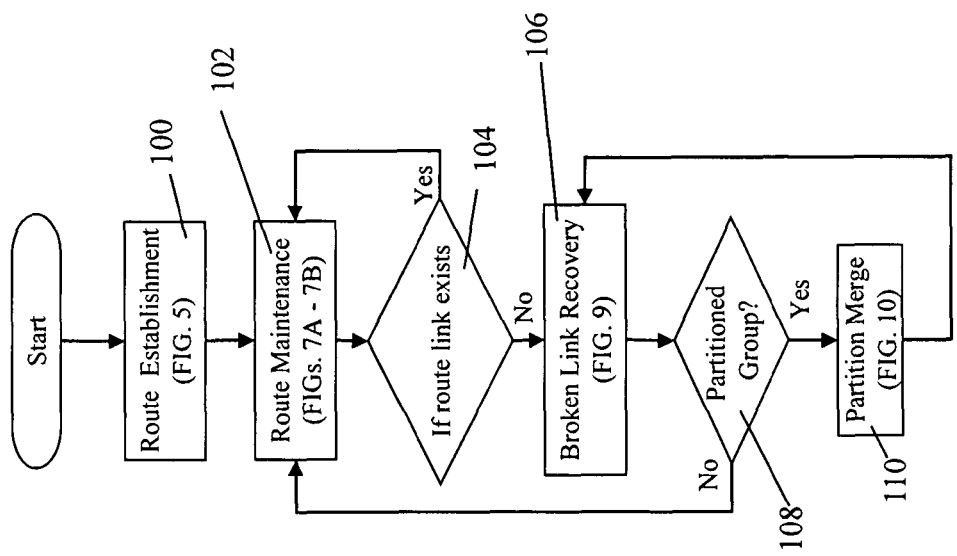
FIG. 1 is an exemplary flow diagram illustrating a system overview of different phases of multicasting in accordance with the present invention.

DETAILED DESCRIPTION OF THE INVENTION (1) Introduction

Traditional multicast trees forward duplicate multicast packets on multicast point-to-point branches. Transmission of the same information from a node to a plurality of specified mobile wireless nodes (group of nodes) is very inefficient if the information is replicated for each group member at the source node, with all replications traveling throughout the network to reach each individual member node. In addition, most of the techniques that have been developed for multicasting datagram packets across networks to a group of destinations in one-to-many communications without any unnecessary packet duplication rely on assumptions of node homogeneity and unidirectional links. These methods would be of limited use for enabling multicasting in the Next Generation Internet (NGI) architecture.

The NGI comprises of a three-tier network structure with a super-high-speed fiber-optic core network as the first tier, with an exemplary gigabit to terabit bandwidth. Range-extension sub-networks with hundreds of megabit bandwidths, as the possible second tier, will bridge between the NGI core and the local access networks, which comprise the NGI third tier. The local access networks tier, such as an ad-hoc packet-radio network, serve end-users and concentrate user traffic of moderate-bandwidth (hundreds of kilobits). NGI will use Low Earth Orbiting (LEO) and Geo-stationary (GEO) satellite networks since global coverage is crucial for the implementation of the NGI system. Due to the inherent broadcast nature of their coverage, both LEO and GEO satellite networks may serve as the ideal bridge between the NGI core (the first tier) and the local access networks (third tier). Given the NGI hybrid architecture, it would be difficult to implement multicasting capability over the entire network, because packet radio network and satellite communication research and developments have so far been focusing on routing schemes in their own sub-network domain, with little consideration about efficiency and flexibility in integration with other sub-network domains. Since the vision of the NGI program is to develop novel inter-networking techniques for seamless integration of the NGI core, range-extension, and the access networks, hybrid multicasting in such an environment is crucial to achieve continuos connectivity with great flexibility and survivability. The present invention provides solutions to the above NGI requirements and other problems described in the prior art by teaching a collaborative multicast routing technique that enables reliable and fault-tolerant multicasting in hybrid, multi-tiered mobile wireless networks with a heterogeneous set of mobile wireless nodes.

The present invention is a hybrid multicast routing protocol that can combine satellite direct broadcasting with local redistribution to achieve scalable, reliable, and low-cost multicast services. It provides a multicast routing technique to dynamically and effectively distribute relevant information to multiple mobile users, such as information dissemination in the battle field networks, Internet smart cars, remote sensor fusing networks, ubiquitous bio-terrorism data network, etc. These situation awareness systems require the integration of ad-hoc mobile, wireless and satellite networks, and robust connectionless communications with survivable end-to-end networking capabilities. The present invention provides a hybrid satellite and multi-hop wireless networks to support continuous operation among mobile users with different types of data requirements in restrictive environments (urban, heavily forested, mountainous, etc.). It provides a scaleable and reliable protocol infrastructure to support a hybrid wireless communication network comprising of a plurality of randomly scattered mobile nodes (ad-hoc network), which is supported by satellite extension networks.

The broadcast nature of the satellite medium, the global coverage of a GEO or LEO constellation, and the large cell size (spot-beam) make it advantageous to use satellite network to deliver multicast packets for NGI core or the access networks. Hence, instead of sending duplicate multicast packets on multicast point-to-point branches in traditional multicast-tree delivery on the ground-based wired networks, the present invention forwards multicast packets onto a satellite network and broadcasts the packets in selected cells that have multicast membership. The bandwidth consumption remains constant regardless of the membership size within the cell due to the inherent broadcast nature of the satellite channel in each cell (spot-beam). Since only a small sub-set of nodes can receive multicast directly from the satellite, the CCAs that receive the multicast traffic will perform a limited range local multicast (redistribution) to deliver the packets to every group member in the cell.

The present invention also provides an architecture that employs standard ad-hoc routing and Medium Access Control (MAC) protocol infrastructure to connect isolated groups of randomly scattered mobile nodes (each grouping forming a Metropolitan Area Network (MANET)) by means of range-extending nodes. The range-extending nodes are typically airborne communication nodes, or possibly LEO/GEO satellites. Such an aerial range extension network can complement the terrestrial MANET to provide communications between land mobile nodes in the face of blockages, obstructions, channel degradations, etc. In this setup, only a subset of the set of all ground nodes is deployed as the primary connections between the aerial nodes and the ground MANET nodes. Thus, these comparatively powerful mobile connector nodes or root nodes (Cross Layer Communication Agents (CCAs)) can act as bridges to interface several ad-hoc networks or isolated clusters of nodes. Thus, the present invention, by allowing multicast trees to be formed in hybrid networks systems, is essential to the overall requirements of the next generation of wireless multimedia networks.

Before providing details regarding the various methodologies of the invention, first a glossary of terms is provided as a reference for the reader. Next, a system overview is provided, describing the interconnection and operation of various major components of a system in accordance with the present invention. After the system overview, a data processing system overview is presented to acquaint the reader with the various components typically found in a data processing system that may be used in conjunction with the present invention. Finally, a discussion section is provided in which the' various major components presented in the system overview are discussed in detail:

(2) Glossary

In order to provide a working frame of reference, a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Active Node—An active node is a node on the critical path between a root node and a group member node that performs forwarding duties.

ADVERTISEMENT—An ADVERTISEMENT is any type of an announcement or information initiated from a root node as a request for establishment of a path.

Backward Node List—In general, a Backward Node List is a field within a control packet or message, which comprises a list of nodes from which an information traveled, starting from a member node.

Backward path—A backward path is the route that information travels from a member node towards a root node.

Best-Path—Best-Path is any path used for efficient transmission of information.

Bi-directional nodes—Bi-directional nodes are capable of forwarding broadcast messages in backward and forward directions.

Control packet—A control packet is a control message that contains control fields that allow for uniform management of the various phases of a multicast tree, including the establishment of its route, maintenance, recovery of broken links within the route, and its merging into a multicast group, if partitioned.

Critical Path—In general, a critical path is a route from which a message traverses, comprised of active nodes from root to group members nodes, inclusive.

Data packet—A data packet is a data message with no control fields.

Forward Node List—In general, a Forward Node List is a field within a control packet or message, which comprises a list of nodes from which an information traveled, starting from a root node.

Forward path—A forward path is the route that information travels from a root node toward a member node.

Forwarding—Forwarding is the sending or transmitting of information from one node to another node along a path.

Forwarding Flag—A parameter within a control message that, when set to ON, indicates that a node is on a forwarding duty (an active node).

Group—A group is comprised of a set of subscriber or member nodes.

Hop—A hop is a path between two nodes, along which information is transmitted.

Heterogeneous wireless set of nodes—Heterogeneous sets of nodes are comprised of both unidirectional and bi-directional sets of nodes.

Unidirectional nodes—These are nodes within a heterogeneous set that are arranged to broadcast a message in a forward direction to other downstream nodes only.

Hybrid Networks—Hybrid networks comprise of both ground-based and satellite-based nodes.

Inactive node—An inactive node is defined as a neighbor node that is fully receptive of its upstream and downstream active nodes, but that is not on forwarding duty. An inactive node could take over the forwarding duty, if necessary.

Intermediate node—Any nodes within a network between the root node and another member node.

Member node—A node that belongs to a group is a member node. In general, a member node is the ending node for a message traveling from a root node. Member nodes can also act as intermediate nodes.

Message—A message is any type of information carrying unit, such as data packet, control packet, etc.

Multicast—Multicasting is a technique developed to send datagram packets across networks to a group of destinations in a one-to-many communication scheme.

Multicast neighbor nodes—Inactive nodes that participate in a multicast tree, but that are not on forwarding duty.

Multi-tiered—A network of networks, which may involve nodes based on ground, subterrain, air, or in space.

Node—A node is a transceiver communication and/or computing unit.

Node list—In general, a node list is an address track field within a control packet or message, which comprises a list of nodes through which information traveled.

Packet—A packet is a unit of information exchange.

Receptive-Inbound—A parameter within a control message that indicates to an inactive neighbor node participating in a multicast tree whether an active downstream node is receiving messages from an active upstream node.

Receptive-Outbound—A parameter within a control message that indicates to an inactive neighbor node participating in a multicast tree whether an active upstream node is broadcasting messages to an active downstream node.

Reconstructed Path Flag—A parameter within a control message that, when set to ON, indicates a reconstructed path.

REFRESH—A REFRESH is a control message periodically transmitted by a root node to preserve an already established route, and more specifically, to detect and prevent link breakage.

REPAIR—A REPAIR is a control message by which the system locally repairs any link breakage. It is a unicast control packet (message) to a root node, which may be considered as a cached REFRESH control list with a REPAIR mode.

REPLY—A REPLY is a control message that a member node initiates upon receipt of an ADVERTISEMENT from a root node.

Root node—A root node is a gateway or any node that allows other nodes to access a resource, and it can be a land-based or space-based communication unit, such as a satellite.

Unicast—Unicast is a broadcast of information from one node to another.

(3) System Overview

The present invention provides a collaborative multicast routing technique that enables reliable and fault-tolerant multicasting in hybrid, multi-tiered mobile wireless networks with a heterogeneous set of mobile wireless nodes. As illustrated in FIG. 1, the present invention provides a route establishment phase 100 for a multicast tree that uses control packets. A multicast path is considered established when a control packet has all the node addresses along its traveled forward and backward route(s). With the route establishment phase 100 of the present invention, it takes only one round trip to establish a route from a root node to a group of nodes.

As further illustrated in FIG. 1, the present invention also addresses issues related to maintaining an already established route in a mobile wireless network. With the route maintenance phase 102 of the present invention, a root node forwards a REFRESH message to all nodes along the established route in both forward and backward directions to maintain their active status with respect to the established route. A REFRESH is therefore a control message periodically transmitted by a root node to preserve an already established route and, more specifically, to detect and prevent link breakage due to many number of reasons. The REFRESH messages are sent out to each group member from the root node by each intermediate node listed in a routing table in the message, broadcasting it until the REFRESH message reaches the group members. Since each active multicast node keeps track only of its active multicast neighbor nodes, the overhead associated with the multicast routing table is significantly reduced. The route maintenance phase 102 continues until a link within the already established route breaks, severing the connection between a transmitting node and a receiving node. If it is determined that a link within an already established multicast route is broken 104, the present invention provides a broken link recovery phase 106 that uses eavesdropping features to allow for recovery of the route by local nodes. The localization scheme is possible because most link breakage can be detected and prevented by a neighboring node or its cooperation, before an actual full-scale link repair procedure is required. The present invention further addresses concerns with respect to possible partitioning of a group of nodes in the mobile wireless environment, as indicated in step 108. When receiving messages from anther partition of the same multicast group, the partition merge phase 110 allows a participating local node in a multicast tree to commence or accelerate a merging process.

The use of local nodes to collaboratively establish, maintain, recover, and merge the hybrid, multi-tiered mobile wireless networks that use heterogeneous set of mobile wireless nodes is the fundamental basis for the collaborative multicast routing scheme of the present invention. All the methods illustrated in the exemplary FIG. 1 may be processed by the exemplary data processing systems described in details below.

(4) Data Processing System Overview

Figure 3:
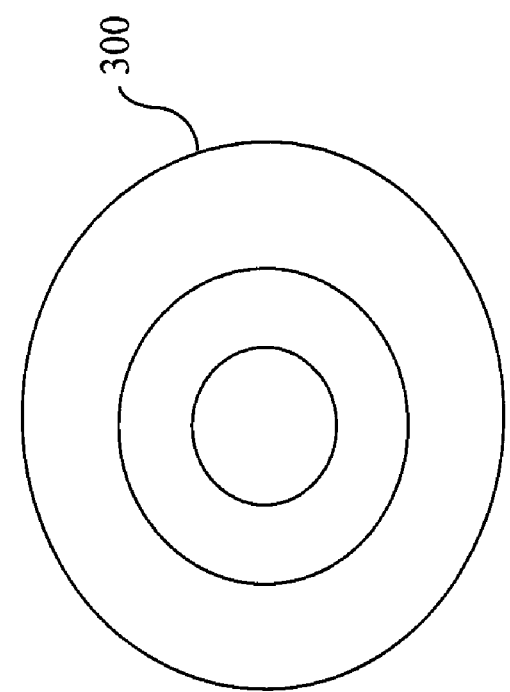
FIG. 3 is an exemplary illustration of a data storage unit (medium) in accordance with the present invention.
Figure 2:
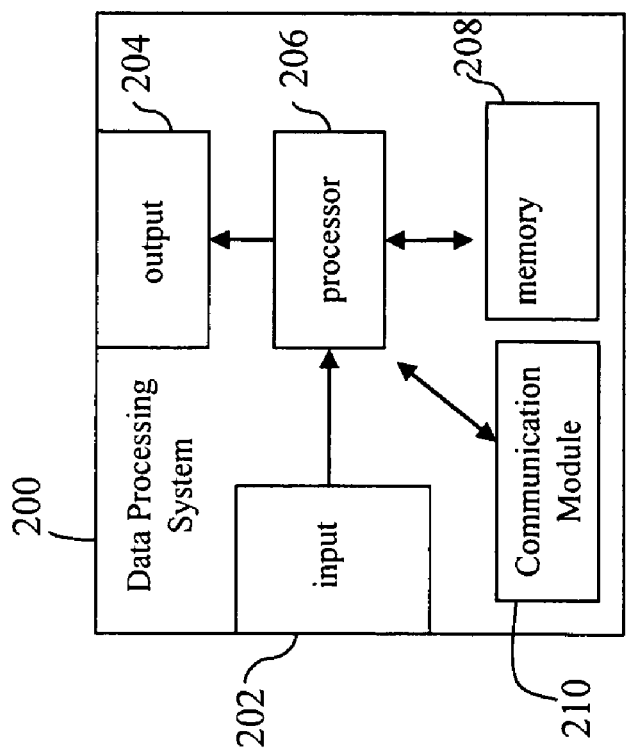
FIG. 2 is an exemplary illustration of a data processing system in accordance with the present invention.

A block diagram depicting the components of a computer system used in the present invention is provided in FIG. 2. The data processing system 200 may be construed as a node or a communication unit used in a wireless communication network that comprises an input 202 for receiving control or data packets from other nodes or any inputting mechanism, including but not limited to, a communication module 210, an external computer connected to the system, an Internet connection, or any computer readable medium 300 (illustrated in FIG. 3) such as a floppy disk, Compact Disk (CD), a Digital Versatile Disk/Digital Video Disk (DVD), and a removable hard drive. The input 202 may also be configured for receiving user input from another input device such as keyboard, a mouse, or any other input device best suited for the current environment conditions. Note that the input 202 may include multiple "ports" for receiving data and user input, and may also be configured to receive information from remote databases using wired or wireless connections. The output 204 is connected with the processor 206 for providing output to the user, possibly through a video display. Output 204 may also be provided to other devices or other programs, e.g. to other software modules, for use therein, possibly serving as a wired or wireless gateway to external databases or other processing devices or nodes. The input 202 and the output 204 are both coupled with a processor 206, which may be a general-purpose computer processor or a specialized processor designed specifically for use with the present invention. The processor 206 is coupled with a memory 208 to permit storage of data and software such as a control packet to be manipulated by commands to the processor.

Figure 4A:
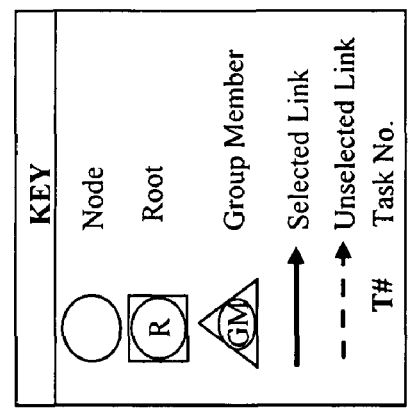
FIG. 4A is an exemplary illustration of a single, simplified multicast tree topography in accordance with the present invention.
Figure 4A:
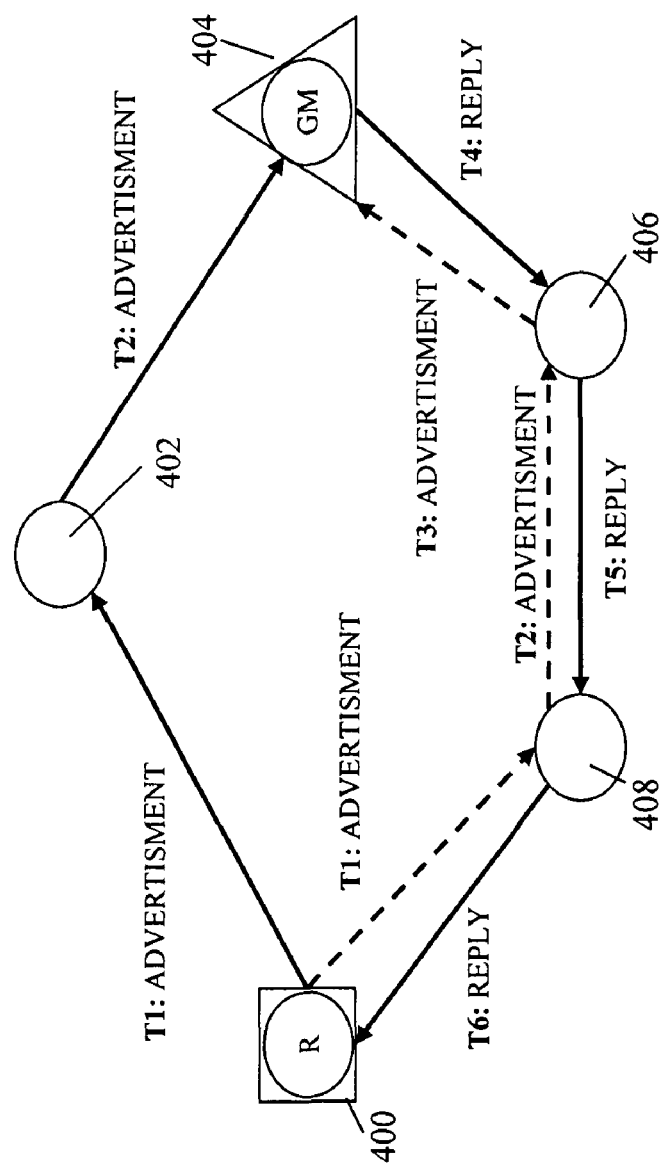

(5) Discussion (a) Route Establishment Phase 100:

FIG. 4A is an exemplary simplified illustration of a mobile wireless network topography for route establishment that may comprise a root node 400, intermediate nodes 402, 406, and 408, and group member node 404. For simplicity, FIG. 4A illustrates only a single multicast tree with only three intermediate nodes and one group member node (hereinafter referred to in the plural). In general, there could be a plurality of overlapped multicast trees, with each multicast tree having only one root node and one or more intermediate and group member nodes. Only one root node exists within a network domain or partition. The criteria in selecting a root node can be based on its advantages, such as satellite-based capability or preferred location. The root node 400 functions as the "gateway" that allows access to information from sources relevant to the group member nodes 404. In general, the root node 400 may be interconnected via a satellite network, and because root 400 is independent of underlying unicast routing protocol, initial control packet flooding by the root node 400 is possible. However, with the optional use of GPS-capable add-on devices, the flooding coverage area by root 400 could be significantly diminished, yet sufficient. Consequently, network traffic overhead with respect to flooding will be substantially reduced. Nonetheless, the nodes within the multicast tree along the way incrementally construct unicast routing table within a control message that traverses a node.

It should be noted that the root node 400 does not know the location of its group member nodes 404, nor does it know the path to the group members 404 to enable it to forward a message to them. However, the root node 400 is cognizant that there are intermediate nodes 402, 408, and 406 between itself and its group member nodes 404. Therefore, in order to forward a message to its group members 404, the root node 400 needs to determine the best forwarding path for the message to reach them. This determination may, for example, involve selecting those intermediate nodes that are capable of forwarding the message, those that are the most efficient in message transfer, and so on. The group member nodes 404 are nodes that receive information or messages from the root node 400, and they may, for example, be subscribers to a service offered by an organization that is accessible through the root node 400. Hence, the group member nodes 404 belong to a specific group by association with, for example, a service provider.

In general, all the nodes belong to a heterogeneous set of nodes and broadcast their messages for reception by other nodes. Heterogeneous sets of nodes are comprised of both unidirectional and bi-directional sets of nodes. Unidirectional nodes within the heterogeneous set broadcast a message in a forward direction to other downstream nodes only. For example, the root node 400 broadcasts a message in a forward direction, downstream, to node 402. Node 402 may be unidirectional; that is, the node 402 does not have a transmission antenna faced towards the root node 400 for transmission, or a receiving antenna that faces the group member node 404 for reception. In this case, node 402 may receive a broadcast message from the upstream node (the root node 400) and transmit it to the downstream node (the member node 404), but cannot broadcast back a message to its upstream node. Bi-directional nodes within the heterogeneous set forward broadcast messages in backward and forward directions. For example, the exemplary nodes 406 and 408 may be bi-directional in that they can broadcast a message in a forward direction to both their upstream and downstream nodes. To avoid collision when broadcasting, each node has different delay setting to rebroadcast messages.

Regardless of whether a node is unidirectional or bi-directional, one of its main distinguishing factors in a multicast tree is its status within it. For example, a node is a group member node if it belongs to a group within a multicast tree of a root node. However, that same group member node may also function as an intermediate node for another multicast group to which the group member node does not belong. The group member nodes may also function as intermediate nodes for other group member nodes (illustrated in the exemplary FIG. 6) within the same multicast tree. Any intermediate or group member node may have the status of a root node for yet another multicast tree, and any intermediate node may function as group member node for still another multicast tree. Therefore, the node status or the capacity within which a node functions depends on its role at a given time within a multicast tree.

Figure 4B:
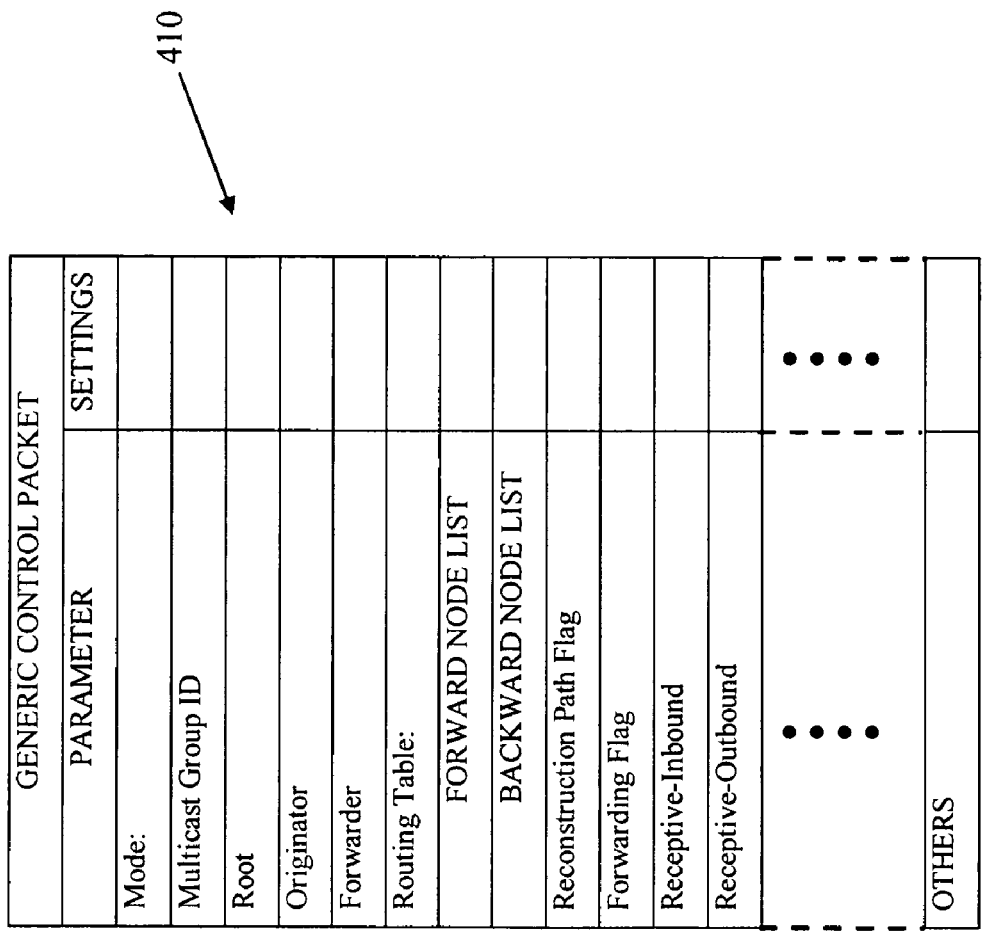
FIG. 4B is an exemplary illustration of a generic control packet (control message) that has an exemplary set of general parameters in accordance with the present invention.

FIG. 4B is an exemplary illustration of a generic control packet (control message) 410 that has an exemplary set of general parameters in accordance with the present invention. The control packet 410 only has control data, and allows for the uniform management of the various phases of a multicast tree, such as the Route Establishment 100, Route Maintenance 102, Broken Link Recovery 106, and Partition Merge 110 phases. The illustrated data structure of the control packet 410 is exemplary, and is simplified for clear understanding and ease of readability with respect to this document. The number and types of parameters listed therein are not exhaustive and are, in fact, application-dependent. For example, the "OTHERS" parameter within the data structure of control packet 410 may include information about the power capacity of a node for signal transmission, or may be a time parameter for indicating the broadcast time and duration of a control packet. The time parameter may also determine if a message has "expired," or is used as a delay mechanism within a collision-avoidance protocol to avoid the collision of a plurality of simultaneous broadcasts from several nodes. Other parameters may provide information with respect to the direction in which a node is capable of transmitting. For example, node 402 of FIG. 4A may be unidirectional. This information can appear in the control packet 410, which will aid a group member node 404 in the selection of a route (described below). Therefore, depending on the deployment scenario of the entire system, the present invention may use other data structure formats.

As illustrated in FIG. 4B, the exemplary control packet 410 may include an exemplary Mode parameter, which may be used for identifying the purpose of the message. Any of the phases may use any one or more potential modes, as required. In addition, all nodes receiving a control packet 410 check all the parameters provided, and respond accordingly. During the Route Establishment phase 100, the root node sets the Mode parameter of the control packet to ADVERTISEMENT. A node receiving a control message with its Mode set to ADVERTISEMENT will, in general, construe this message as a request to establish a path. Hence, the Mode of the control packet set to ADVERTISEMENT, causes the packet to become an ADVERTISEMENT packet (message), which is any type of an announcement or information initiated from a root node as a request for establishment of a path. In general, a group member node that receives an ADVERTISEMENT control packet sets the Mode parameter of the control packet to REPLY. For example, during the Route Establishment phase 100, the group member node 404 upon receiving an ADVERTISEMENT message from a node, resets the Mode parameter to REPLY, and forwards the message back to the root node 400. The REPLY received from the group member node 404 identifies its location to the root node 400 and, more importantly, provides the root 400 with a best forward path that the root node 400 may use to forward a data packet to the group member node 404.

During the Route Maintenance phase 102, the Mode parameter of the control packet may be set to REFRESH by a root node. The REFRESH Mode of a packet is the start of a process by which a root node periodically transmits REFRESH messages to all the multicast tree nodes to preserve an already established route and, more specifically, to enable all nodes to detect and prevent link breakage for a number of reasons described below. Therefore, upon receiving a REPLY control packet, the root node may thereafter reset the control packet Mode to REFRESH, making it a REFRESH control packet, and then forwards it to all nodes within the multicast tree to maintain their "active" status.

During the Broken Link Recovery phase 106, the Mode parameter of the control packet may be set to REPAIR by any node with a broken link. Therefore, the REPAIR Mode of a packet commences the process of link recovery by which local nodes repair any link breakage. The REPAIR packet may be construed as a unicast control packet (message) to a root node, which may be considered as a cached REFRESH control list with a REPAIR mode. The Partition Merge phase 110, as with the other phases, may use any one or more of the Modes to merge two partitions of one multicast group that roam into each other.

The Multicast Group Identification parameter (hereinafter multicast Group_ID) of the exemplary control packet 410 allows a node to distinguish a message intended for a particular multicast group. As mentioned above, in any normal communication scenario, there could be many different multicast groups existing simultaneously, creating an overlap of multicast trees. The multicast Group_ID allows a node to determine if a received message is intended for the node, which determines its status or the capacity within which it must function with respect to the message received. As stated above, an intermediate node may function as a member node in one group and a group member node may function as an intermediate node in another. The multicast Group_ID therefore allows all nodes to be "aware" of their status at a given time with respect to the message received. Hence, a group member node 404 receiving an ADVERTISEMENT message from its multicast group root node 400 will set the control message's Mode parameter from an ADVERTISEMENT to REPLY. However, if the message is not intended for the group member node 404 (determined by the Group_ID), then the node 404 may, for example, function as an intermediate node and simply forward the message without setting the message Mode parameter.

The Root parameter of the exemplary control packet 410 identifies the root of a multicast tree. If a plurality of multicast trees exists, then each will have its own root identified by the Root parameter. A node therefore may, for example, receive two different ADVERTISEMENT messages from two root nodes of two multicast trees and be a member of both. This node determines the appropriate response for each message based on the Root parameter. The Originator parameter of the exemplary control packet 410 identifies the Originator of a message and the Forwarder parameter identifies the actual forwarder of the message. The Originator parameter allows a receiver node to determine which node the message is from and the Forwarder parameter allows a receiver node to determine which node actually forwarded the message. That is, a node may originate a message, but use a proxy node to forward the message. The Forwarder parameter allows receiver nodes to distinguish a proxy (if any) from the originator of a message.

The Routing Table parameter of the control packet 410 is comprised of a FORWARD NODE LIST and a BACKWARD NODE LIST, which enable the construction of a route (using "best-path forwarding" mechanism) by each individual node within a multicast tree during the tree's various phases from Route Establishment to Partition Merge. The FORWARD NODE LIST is a list of all nodes that a message traverses in the forward direction, starting from a root to reach its destination (in general a group member node). The BACKWARD NODE LIST is a list of all nodes that a message traverses in a return path from the destination back to the root node. Other data structures for recording or tracking a path that a message travels are also possible. The Reconstructed Path Flag is a parameter within the control message that, when set to ON, indicates a reconstructed path. A local node may set this flag when correcting a severed link. The Forwarding Flag is a parameter within the control message 410 that, when set to ON, indicates that a node is on a forwarding duty (an active node). The Receptive-Inbound is a parameter within the control message 410 that indicates, to an inactive neighbor node participating in a multicast tree, if an active downstream node is receiving messages from an active upstream node. The final Receptive-Outbound parameter within the control message 410 indicates, to an inactive neighbor node participating in a multicast tree, if an active upstream node is broadcasting messages to an active downstream node.

Figure 5:
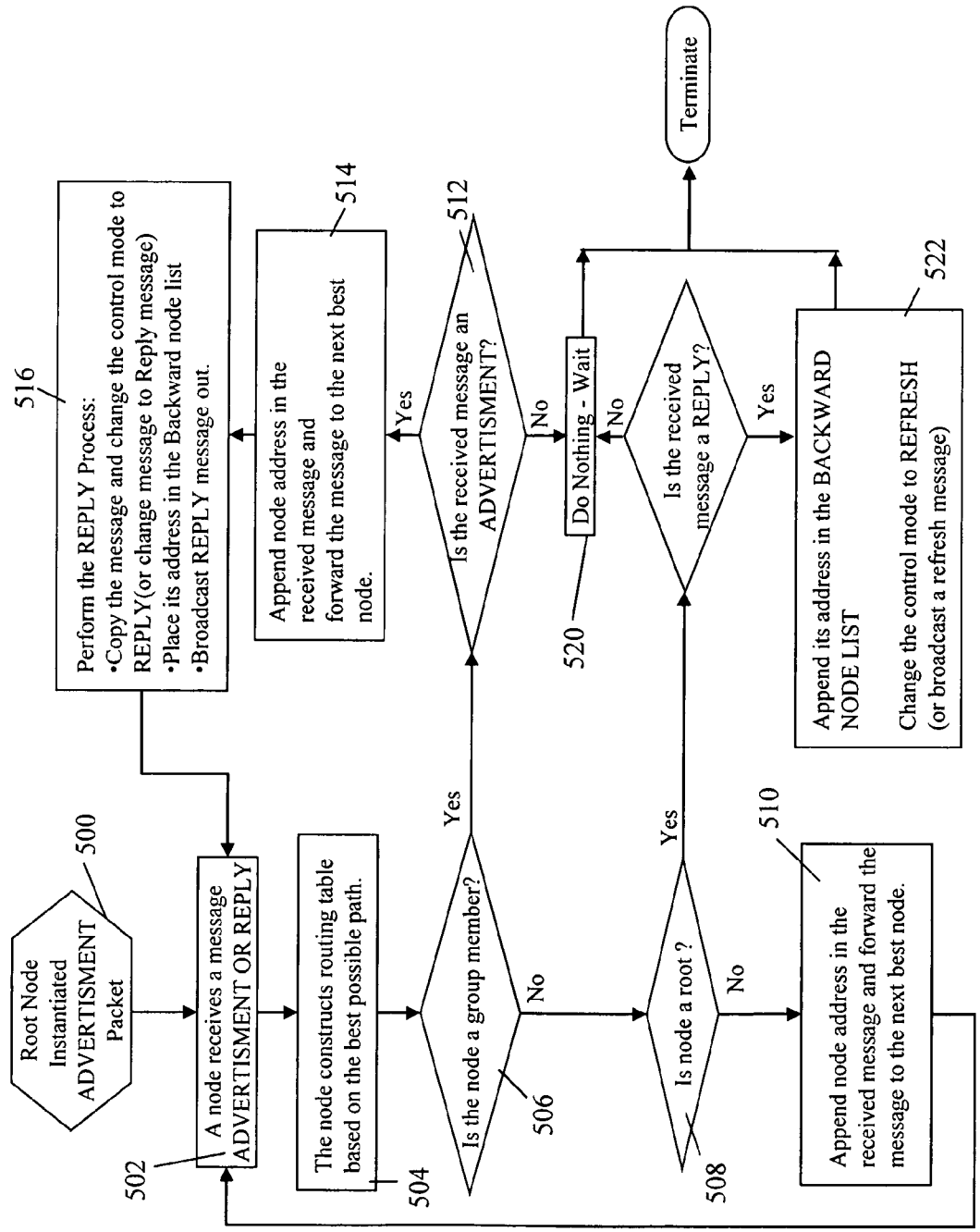
FIG. 5 is an exemplary flow diagram illustrating the required sequence of tasks for establishing a multicast route in accordance with the present invention.

FIG. 5 is an exemplary flow diagram illustrating the sequence of tasks required for establishing a multicast route between a root node and its group member nodes in accordance with the present invention. The method of establishing a route illustrated in FIG. 5 is node-centric, describing a sequence of events for establishing a path with respect to a node, and not a particular type of node (e.g. root, intermediate, or group member). Referring to FIGS. 4A and 5, as illustrated in FIG. 5, initially at step 500 the root node 400 prepares an ADVERTISEMENT control packet 410 in accordance with the following table 1 parameter settings and broadcasts it to commence the construction of a multicast route to complete the task T1 in FIG. 4A. The tables illustrated throughout the text are identical to that shown in FIG. 4B and are presented within the text to show the different parameter settings within each phase of the multicast.

TABLE 1

| PARAMETER | SETTING |
|---|---|
| Mode: | ADVERTISEMENT |
| Multicast Group ID | Group_ID |
| Root | 400 |
| Originator | 400 |
| Forwarder | 400 |
| Routing Table: | |
| FORWARD NODE LIST | (400) |
| BACKWARD NODE LIST | (NULL) |
| Reconstructed Path Flag | OFF |
| Forwarding Flag | |
| Receptive-Inbound | |
| Receptive-Outbound | |
| Others | |

At step 502, the best next hop receiver nodes 402 and 408, which happen to be in the drifting range of the root node 400, receive the ADVERTISEMENT message, and check all of its control parameter settings. At step 504 each of the receiver nodes 402 and 408 construct their own Routing Table as illustrated in the following exemplary tables 2 and 3, respectively (the actual input of data within the node lists of these two nodes is done after step 510, which is described below).

TABLE 2

| PARAMETER | SETTING |
|---|---|
| Mode: | ADVERTISEMENT |
| Multicast Group ID | Group_ID |
| Root | 400 |
| Originator | 400 |
| Forwarder | 402 |
| Routing Table: | |
| FORWARD NODE LIST | (400, 402) |
| BACKWARD NODE LIST | (NULL) |
| Reconstructed Path Flag | OFF |
| Forwarding Flag | |
| Receptive-Inbound | |
| Receptive-Outbound | |
| Others | |

TABLE 3

| PARAMETER | SETTING |
|---|---|
| Mode: | ADVERTISEMENT |
| Multicast Group ID | Group_ID |
| Root | 400 |
| Originator | 400 |
| Forwarder | 408 |
| Routing Table: | |
| FORWARD NODE LIST | (400, 408) |
| BACKWARD NODE LIST | (NULL) |
| Reconstructed Path Flag | OFF |
| Forwarding Flag | |
| Receptive-Inbound | |
| Receptive-Outbound | |
| Others | |

At the next step 506 it is determined if the receiver nodes 402 or 408 are group member nodes and, if they are not group member nodes, at step 508 it is determined if the receiver nodes are root nodes. The determination of the node type at steps 506 and 508 is necessary because the messages traversing across the network are not cognizant of the type of node that has received them. Furthermore, multiple multicast trees may exist simultaneously and any node in any given time can act or function as a root, an intermediate, or a group member node, depending on the multicast group with which they are associated. Thus, it is only for clarity and better understanding of the present document that FIG. 4A illustrates a single, simplified multicast tree topography.

Continuing, if it is determined that nodes 402 or 408 do not function or act as member or root nodes, then by default they function as intermediate nodes. As intermediate nodes, at step 510 they perform the "best path forwarding" mechanism. Intermediate nodes 402 and 408 select to forward a message from a plurality of received messages from different multicast trees for which they can perform the "best path forwarding" mechanism. (Recall that multiple multicast trees may exist simultaneously, and hence a node may receive several ADVERTISEMENT packets instantiated by different root nodes.) Therefore, the nodes 402 and 408 select an ADVERTISEMENT message with the best possible forward path from all received ADVERTISEMENT messages, append their address in the selected ADVERTISEMENT message, update the FORWARD NODE LIST and the BACKWARD NODE LIST portions of their routing table as illustrated in the above exemplary tables 2 and 3, and forward the message along the best next hop after a predetermined delay to avoid collision of their messages with other broadcast messages from other nodes. Other collision avoidance protocols may also be used. This completes the illustrated task T2 shown in FIG. 4A. The process illustrated in FIG. 5 loops back to step 502, where the next nodes 406 and 404 receive the ADVERTISEMENT message from their respective upstream intermediate nodes 408 and 402.

The processing steps for node 406 are identical to those for intermediate nodes 402 and 408 described above. That is, the node 406, at step 502, receives the ADVERTISEMENT message from its upstream intermediate node 408, checks all of the parameter settings and, at step 504, constructs its own Routing Table comprised of a FORWARD NODE LIST and a BACKWARD NODE LIST within the message (illustrated in the following exemplary table 4). After steps 506 and 508 having been performed, as an intermediate node, at step 510 the node performs the "best path forwarding" mechanism described above, and forwards the message along the next best hop after a predetermined delay to avoid collision of its broadcast with broadcast messages from other nodes, and completes task T3 illustrated in FIG. 4A. The process illustrated in FIG. 5 loops back to step 502, where the next node 404 receives the ADVERTISEMENT message from its upstream intermediate node 406.

TABLE 4

| PARAMETER | SETTING |
|---|---|
| Mode: | ADVERTISEMENT |
| Multicast Group ID | Group_ID |
| Root | 400 |
| Originator | 400 |
| Forwarder | 406 |
| Routing Table: | |
| FORWARD NODE LIST | (400, 408, 406) |
| BACKWARD NODE LIST | (NULL) |
| Reconstructed Path Flag | OFF |
| Forwarding Flag | |
| Receptive-Inbound | |

TABLE 4-continued

| PARAMETER | SETTING |
|---|---|
| Receptive-Outbound | |
| Others | |

At step 502 the node 404 receives the same message from both node 402 (the above exemplary table 2) and node 406 (the above exemplary table 4), and checks their control parameter settings. At step 504, node 404 constructs two Routing Tables illustrated as the following tables 5 and 6, one for each message received. That is, each Routing Table will have its own FORWARD NODE LIST and BACKWARD NODE LIST, with each list having the addresses of the respective nodes from which each of the messages traversed along the path from the root 400 to the node 404.

TABLE 5

| PARAMETER | SETTING |
|---|---|
| Mode: | ADVERTISEMENT |
| Multicast Group ID | Group_ID |
| Root | 400 |
| Originator | 400 |
| Forwarder | 402 |
| Routing Table: | |
| FORWARD NODE LIST | (400, 402, 404) |
| BACKWARD NODE LIST | (NULL) |
| Reconstructed Path Flag | OFF |
| Forwarding Flag | |
| Receptive-Inbound | |
| Receptive-Outbound | |
| Others | |

TABLE 6

| PARAMETER | SETTING |
|---|---|
| Mode: | ADVERTISEMENT |
| Multicast Group ID | Group_ID |
| Root | 400 |
| Originator | 400 |
| Forwarder | 408 |
| Routing Table: | |
| FORWARD NODE LIST | (400, 408, 406, 404) |
| BACKWARD NODE LIST | (NULL) |
| Reconstructed Path Flag | OFF |
| Forwarding Flag | |
| Receptive-Inbound | |
| Receptive-Outbound | |
| Others | |

At the next step 506, it is determined if the node 404 is a group member node. If the node 404 is a group member node, then at step 512 the method determines if the two messages received by the group member node 404 are ADVERTISEMENT (i.e. it determines the control packet Mode setting). If they are not, then at step 520 the group member node 404 does nothing and waits. For example, the packet may be a REPLY packet from another multicast group member node, requiring no action from node 404. If at step 512 it is determined that the messages are ADVERTISEMENT, the group member node 404 at step 514 appends its address to one of the constructed Routing Tables of one of those messages.

At this point, the group member node 404 has all the information to determine (and select) the best forward path from which the packet 410 traversed from the root node 400 to itself. The scenario in which the system is deployed will dictate the selection criteria for the "best forwarding path." For example, a deployment scenario requiring the selection of the shortest path will dictate that node 404 select the control packet 410 received from node 402 (table 5), and discard the message received from node 406 (table 6). On the other hand, the deployment scenario may be based on residual power of the network of nodes for signal transmission, signal quality, and so on, all of which could be part of the parameters within the exemplary control packet 410. For example, the node 402 could be deployed as part of a sensor network, in which case power may be an important issue. The system should not keep sending everything through this node based on the shortest path protocol because the node 402 may become overloaded, and therefore have too little power. In this case, the group member node 404 may discard the shortest path that includes the node 402 and use the longer path (table 6). In other cases, time may be a factor for the selection of a path. All nodes and packets have timers that may expire. In such a case, the group member node 404 may determine the best forwarding path based on the time that it took for a message to arrive. For example, the path with the longer time may not be efficient for the intended application. Therefore, there are many factors to consider when selecting a path, all of which are application-dependent, such as power, number of hops, maintaining regular silence (e.g. in military applications), etc. The present invention provides a Route Establishment method that is independent of any specific deployment scenario and that is adaptive in that the control packet may include any parameter required for a specific deployed system.

Figure 6:
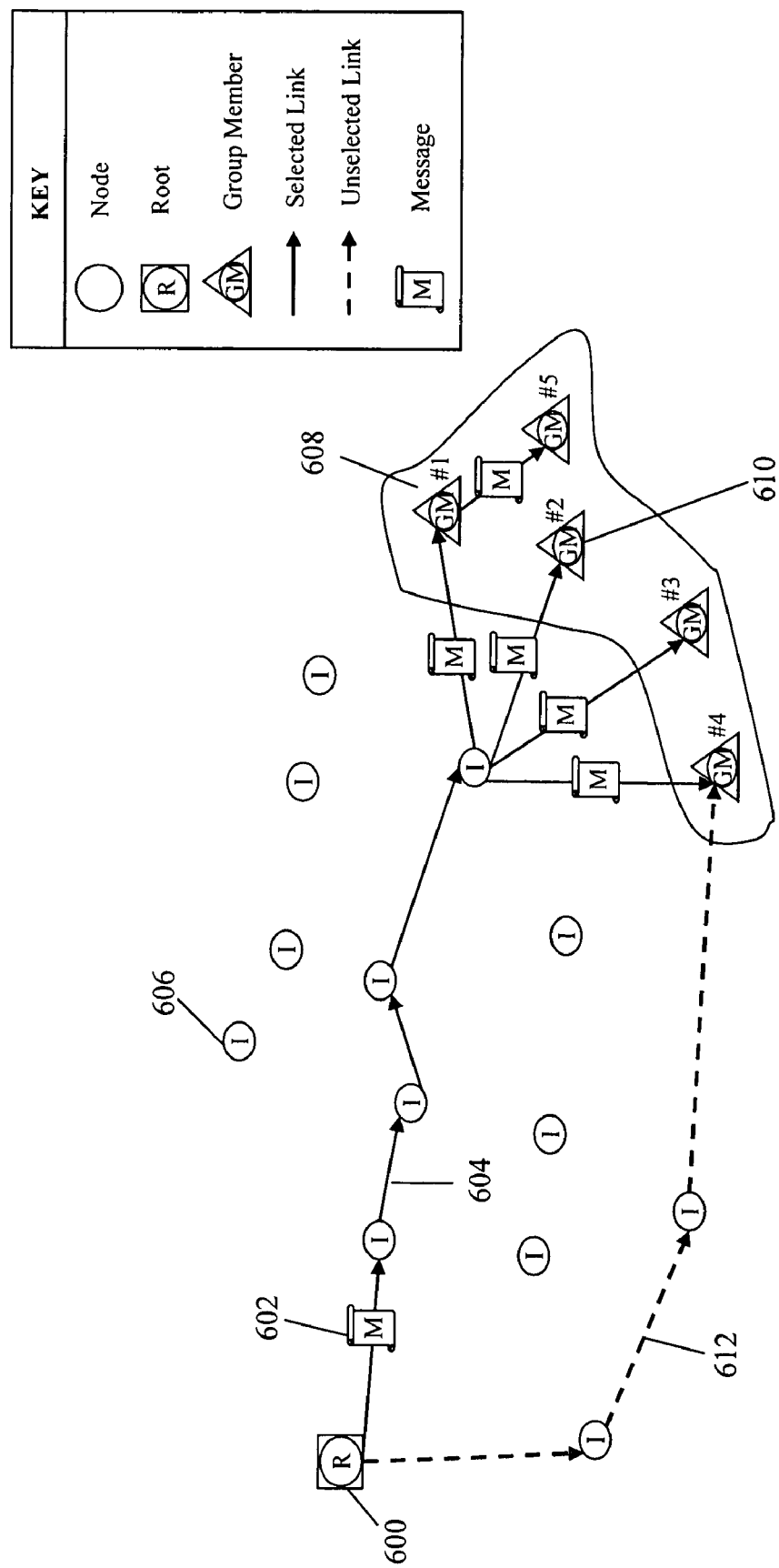
FIG. 6 is an exemplary illustration of a multicast optimized route in accordance with the present invention.

For now, assume the exemplary forward path selected by the group member node 404 is based on the shortest path, containing the addresses of root node 400, intermediate node 402, and its own address, as illustrated in the above table 5. After selection of the appropriate forward path (at step 514), the group member node 404 performs a REPLY process at step 516. It copies the message and sets the control Mode to REPLY (as indicated in table 7), places its address in the BACKWARD NODE LIST, and broadcasts the REPLY message using the "best forwarding path" to the next best hop nodes after a predetermined delay to avoid collision of its broadcast with messages broadcast from other nodes. This completes task T4 shown in FIG. 4A. (There are instances where a group member node may also function as an intermediate node within its group, forwarding a data to other member nodes, as illustrated in FIG. 6).

TABLE 7

| PARAMETER | SETTING |
|---|---|
| Mode: | REPLY |
| Multicast Group ID | Group_ID |
| Root | 400 |
| Originator | 404 |
| Forwarder | 404 |
| Routing Table: | |
| FORWARD NODE LIST | (400, 402, 404) |
| BACKWARD NODE LIST | (404) |
| Reconstructed Path Flag | OFF |
| Forwarding Flag | |
| Receptive-Inbound | |
| Receptive-Outbound | |
| Others | |

As indicated in FIG. 5, the method loops back to the step 502 again. At this step, the nodes 406 and 402 receive the REPLY message and check the control parameter settings. In order to illustrate the adaptive nature of the present invention, assume that node 402 of FIG. 4A is a unidirectional node, and cannot receive the broadcast message from node 404. That is, it can broadcast a received message in a forward direction to other downstream nodes only. As mentioned above, this is possible if node 402 does not have a transmitting antenna faced towards the root node 400 for transmission and, furthermore, lacks a receiver antenna that faces the group member node 404 for reception. The group member node 404 through the "Others" control parameter of the control packet 410 will know this information when it first receives a message from node 402. All nodes have full knowledge regarding every node through which a packet has traversed to reach them.

Accordingly, node 406 (assume it to be a bi-directional node) receives the broadcast REPLY message at step 502, checks its parameter settings, and at step 504 constructs a Routing Table based on the best possible path as illustrated in the following exemplary table 8:

TABLE 8

| PARAMETER | SETTING |
|---|---|
| Mode: | REPLY |
| Multicast Group ID | Group_ID |
| Root | 400 |
| Originator | 404 |
| Forwarder | 406 |
| Routing Table: | |
| FORWARD NODE LIST | (400, 402, 404) |
| BACKWARD NODE LIST | (404, 406) |
| Reconstructed Path Flag | OFF |
| Forwarding Flag | |
| Receptive-Inbound | |
| Receptive-Outbound | |
| Others | |

The processing steps at 506 and 508 determine if the node 406 is a group member node or a root node, respectively, and if not, the intermediate node 406 perform the "best forwarding path" mechanism. That is, node 406 selects a REPLY message with the best possible forward path from all received REPLY messages of different multicast trees, appends its address in the selected REPLY message, updates the BACKWARD NODE LIST portion of its Routing Table (as indicated in the above exemplary table 8), and broadcasts the message as task T5 to the next best hop after a predetermined delay to avoid collision of its broadcast with other broadcast messages. The process illustrated in FIG. 5 loops back to step 502, where the next node 408 receives the REPLY message from its downstream node 406, and checks its parameter settings.

At step 504 the receiver node 408 constructs a Routing Table based on the best possible path as illustrated in the following table 9:

TABLE 9

| PARAMETER | SETTING |
|---|---|
| Mode: | REPLY |
| Multicast Group ID | Group_ID |
| Root | 400 |
| Originator | 404 |
| Forwarder | 408 |
| Routing Table: | |
| FORWARD NODE LIST | (400, 402, 404) |
| BACKWARD NODE LIST | (404, 406, 408) |
| Reconstructed Path Flag | OFF |
| Forwarding Flag | |
| Receptive-Inbound | |

TABLE 9-continued

| PARAMETER | SETTING |
|---|---|
| Receptive-Outbound | |
| Others | |

The processing steps at 506 and 508 determine if the node 408 is a group member node or a root node, respectively, and if not, the intermediate node 408 perform the "best forwarding path" mechanism. That is, node 408 selects a REPLY message with the best possible forward path from all received REPLY messages, appends its address in the selected REPLY message, and updates the BACKWARD NODE LIST portion of its Routing Table (as indicated in the above exemplary table 9). It then broadcasts the message as task T6 along the best next hop after a predetermined delay to avoid broadcast collisions. The process illustrated in FIG. 5 loops back to step 502, where the next node 400 receives the REPLY message from its downstream intermediate node 408.

At step 504, the receiver node 400 constructs a Routing Table based on the best possible path as illustrated in the following table 10:

TABLE 10

| PARAMETER | SETTING |
|---|---|
| Mode: | REFRESH |
| Multicast Group ID | Group_ID |
| Root | 400 |
| Originator | 400 |
| Forwarder | 400 |
| Routing Table: | |
| FORWARD NODE LIST | (402, 404, 400) |
| BACKWARD NODE LIST | (404, 406, 408, 400) |
| Reconstructed Path Flag | OFF |
| Forwarding Flag | |
| Receptive-Inbound | |
| Receptive-Outbound | |
| Others | |

To continue, at the next step 506, the Route Establishment method determines if node 400 is a group member node and, if it is not, then at step 508 the method determines if node 400 is a root node. If node 400 is a root node, then at step 518, the method determines the type of message received by checking the Mode parameter. If it was a REPLY message (in this case it was a REPLY message from node 408), then at step 522 the root node 400 appends its address to the selected best backward path in the BACKWARD NODE LIST as indicated in the above table 10, and changes the control Mode parameter setting to REFRESH. If the message received by the root node was not a REPLY, then at step 520, the root node 400 simply does nothing and waits. Referring to FIG. 4A, recall that it was assumed that node 402 was a unidirectional node. Therefore, after a predetermined time delay, if the root node 400 does not receive a transmission from node 402, the backward path from the group member node 404 to the intermediate node 402 back to root node 400 terminates.

It should be noted that in the control packet, nodes along the forward path (those of ADVERTISEMENT mode) and backward path (those of REPLY mode) directions are on separate node lists. Intermediate nodes respond to REPLY control messages similar to ADVERTISEMENT control messages, using the best-path forwarding mechanism. That is, they select the best possible path for a selected packet, append their own addresses and, after a delayed time, forward the packet out. Upon receiving REPLY control packets within a preset time limit, the root node selects the best path for each group member and performs the above-mentioned REFRESH process. That is, it changes the packet mode from REPLY mode to REFRESH mode, rotates its address to the back of the FORWARD NODE LIST, and sends completed control packets out periodically. Since only non-duplicate node IDs appear on the node list for each direction (in addition to the use of sequence number) loop formation is not possible. In addition, note that the best forward path from a root node to a group member node is selected by the group member node and the best forwarding path (in a backward direction) from the group member node to the root node is determined by the root node. This is the case because initially the root node does not know a forwarding path to the group member node. In addition, the backward path cannot be determined until the root node actually receives the REPLY data to "see" the actual paths or nodes from which various packets traversed from group member nodes to it.

FIG. 6 illustrates that multicasting optimization with respect to path construction is not necessarily the shortest path policy (route 612) used by other systems, but rather, it generates the shortest average path (route 604) between a root 600 and all its group member nodes 610. In a wired network, it is possible to generate and use the shortest path protocol, but not in multicast mobile wireless environment, especially one that makes use of hybrid, multi-tiered, heterogeneous set of nodes as illustrated with respect to the exemplary nodes 400 and 402 of FIG. 4A. Hence, FIG. 6 illustrates an efficient method of constructing a multicasting tree for hybrid, multi-tiered, heterogeneous set of nodes in a mobile wireless environment. One could also interpret multicast optimization as one that saves resources where few or no duplication of messages occurs.

As described above, by the end of one full cycle (a single round-trip) of a control packet, the multicast-tree is constructed, where the root node 400 changes the control message mode to REFRESH to commence the Route Maintenance phase of the multicast operation. The Route Maintenance phase is optional in wireless networks with nodes that are not mobile. Nonetheless, after the initial route is established, nodes along the multicast tree in both forward and backward directions have completed their forwarding tables, enabling the transmission of actual data messages 602 as illustrated in FIG. 6. The data message headers have no node lists.

Figure 7A:
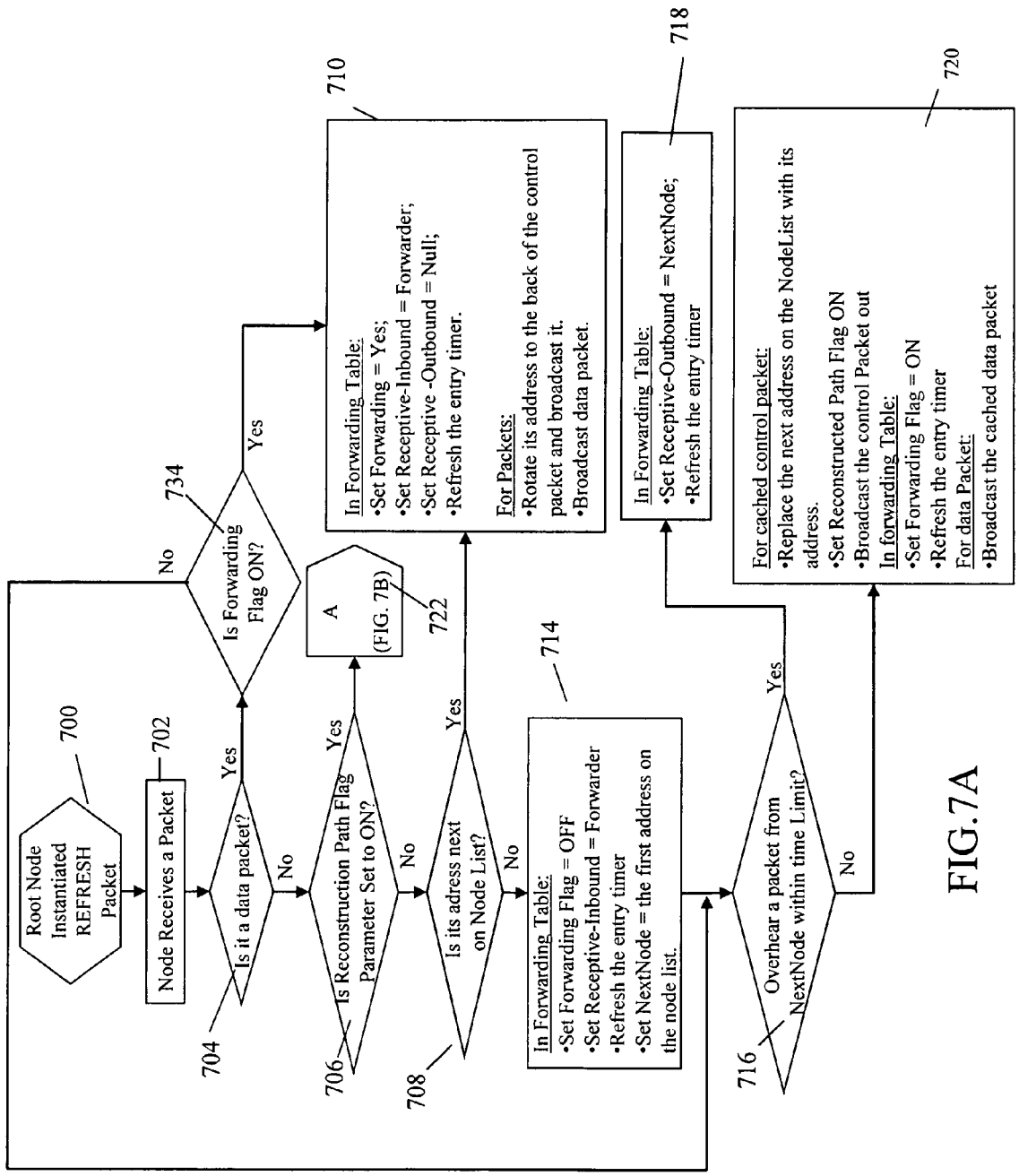
FIGS. 7A and 7B are exemplary flow diagrams illustrating the required sequence of tasks for maintaining a multicast route in accordance with the present invention.
Figure 7B:
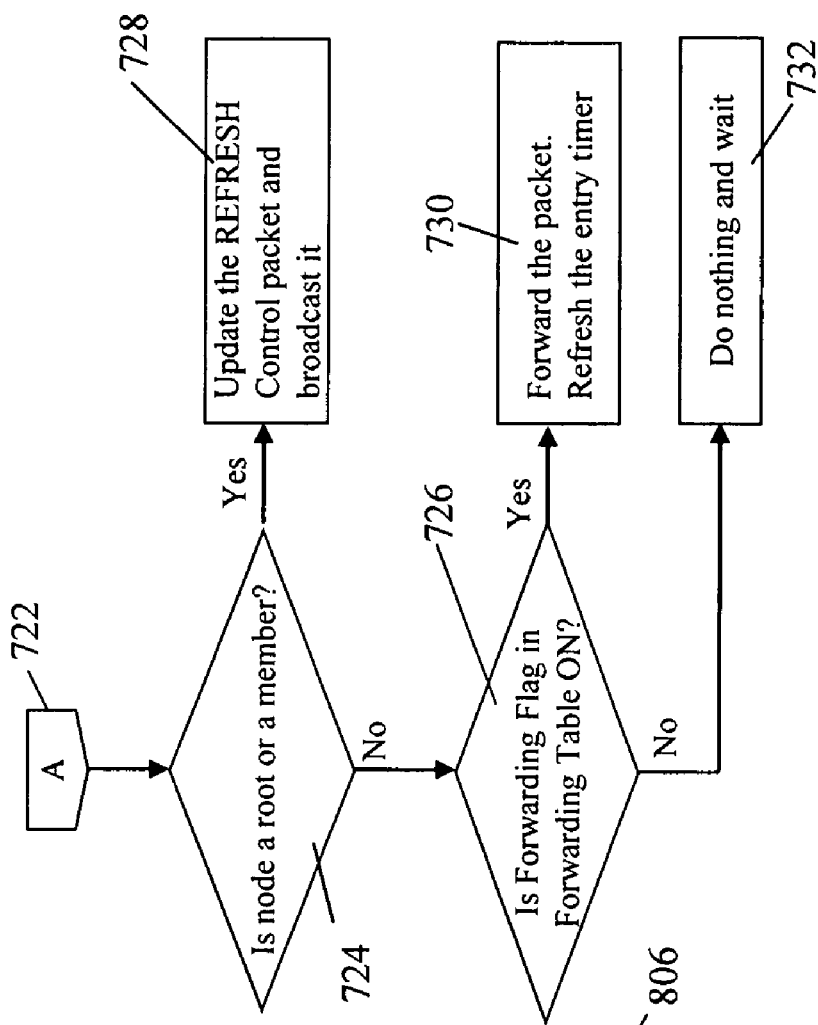

(b) Route Maintenance Phase 102:

Once the route establishment phase has competed, control packets in REFRESH mode are periodically sent out by a root node in order to preserve the established route, and more importantly, to detect and prevent link breakage due to node mobility, node failure, and/or terrain blockage. The combined FIGS. 7A and 7B are exemplary flow diagrams illustrating the required sequence of tasks for maintaining a multicast route between a root node and its group member nodes in accordance with the present invention. The method of maintaining a route illustrated in FIGS. 7A and 7B is node centric, describing a sequence of events for maintenance of a path with respect to a node, and not a particular type of node (e.g. root, intermediate, or group member).

The process for route maintenance may be broadly divided into maintaining a route under (I) Normal Circumstances (exemplary FIG. 8A), where nodes continue to maintain their position (location) with no terrain blockage, and (II) Other Circumstances where for example mobility of nodes may sever links within a multicast tree (FIGS. 8B-8E). The Route Maintenance method illustrated in FIGS. 7A and 7B will first be described under (I) Normal Circumstances as illustrated in FIG. 8A and later with respect to (II) Other Circumstances as illustrated in FIGS. 8B to 8E.

Figure 8A:
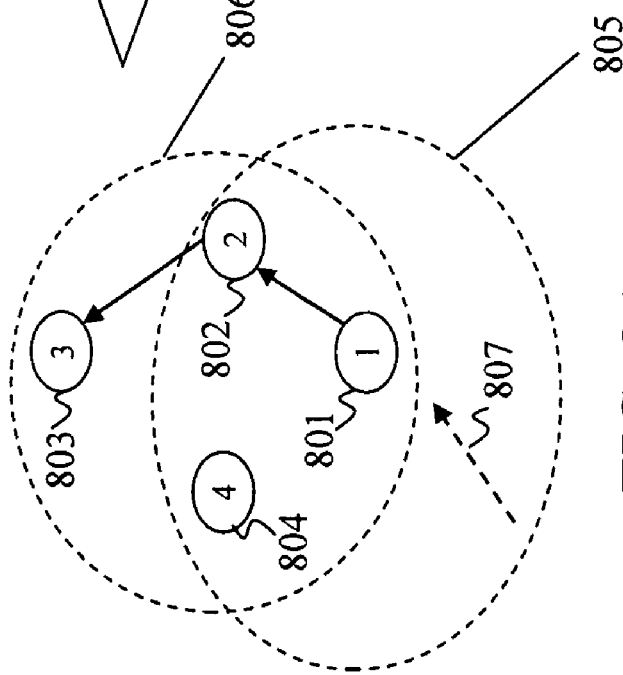

(I) Normal Circumstance (Without Node Mobility Effect):

FIG. 8A illustrates a typical scenario of an established multicast tree, with active nodes 801, 802, and 803, and an inactive neighbor node 804. With FIG. 8A, assume the forward path, as illustrated, and the dashed circles 805 and 806 as the transmission range of the nodes. Referring to FIGS. 7A and 8A, as illustrated in the exemplary FIG. 7A, initially, at step 700, a root node periodically broadcasts a complete REFRESH control packet 807 (FIG. 8A) to its multicast tree as illustrated in the following exemplary table 11.

TABLE 11

| PARAMETER | SETTING |
| --- | --- |
| Mode: | REFRESH |
| Multicast Group ID | Group_ID |
| Root | Root |
| Originator | Root |
| Forwarder | Root |
| Routing Table: | |
| FORWARD NODE LIST | (801, 802, 803, . . . , Root) |
| BACKWARD NODE LIST | ( . . . ) |
| Reconstructed Path Flag | OFF |
| Forwarding Flag | |
| Receptive-Inbound | |
| Receptive-Outbound | |
| Others | |

The node 801, as the best next hop, receives the REFRESH control packet as indicated at step 702, checking all of its parameter settings. At step 704, it is determined if the data received is a data packet, and if it is determined that the packet received is not a data packet, at step 706 it is determined if the Reconstructed Path Flag parameter is set to ON. In other words, at step 706 the method determines if the path of the multicast tree has been reconstructed since data was last received. If the Reconstructed Path Flag is OFF (the path was not changed), at step 708 it is determined if node 801 address is next on the node list. That is, was node 801 supposed to receive the packet? If node 801 has its address on the FORWARD NODE LIST as the next node, at step 710 the Forwarding Flag parameter is set to ON, the Receptive-Inbound to 801, Receptive-Outbound to NULL, and the entry timer is refreshed. In addition, node 801 rotates its address to the back of the control packet Routing Table and broadcasts the packet out. The process illustrated in FIG. 7A loops back to step 702, where the next best hop node 802 receives the REFRESH message from its upstream node 801, and checks its parameter settings. The following exemplary table 12 illustrates the parameters set by the node 801 before forwarding the packet to node 802.

TABLE 12

| PARAMETER | SETTING |
| --- | --- |
| Mode: | REFRESH |
| Multicast Group ID | Group_ID |
| Root | Root |
| Originator | Root |
| Forwarder | 801 |
| Routing Table: | |
| FORWARD NODE LIST | (802, 803, . . . , Root, 801) |
| BACKWARD NODE LIST | ( . . . ) |
| Reconstructed Path Flag | OFF |

TABLE 12-continued

| PARAMETER | SETTING |
|---|---|
| Forwarding Flag | ON |
| Receptive-Inbound | 801 |
| Receptive-Outbound | NULL |
| Others | |

At step 704, it is determined if the data received by node 802 is a data packet, and if it is not a data packet, at step 706 it is determined if the Reconstructed Path Flag is set to ON. If the Reconstructed Path Flag is OFF, at step 708 it is determined if the address of node 802 is next on the node address list. That is, was node 802 supposed to receive the packet? If node 802 has its address on the FORWARD NODE LIST as the next node, at step 710 the Forwarding Flag parameter is set to ON, the Receptive-Inbound to Forwarder, Receptive-Outbound to NULL, the entry timer is refreshed. In addition, node 802 rotates its address to the back of the control packet and broadcasts the packet. The process illustrated in FIG. 7A loops back to step 702, where the next node 803 on the FORWARD NODE LIST receives the REFRESH message from its upstream node 802, and checks its parameter settings. The following exemplary table 13 illustrates the parameters set by the node 802 before forwarding the packet to node 803.

TABLE 13

| PARAMETER | SETTING |
|---|---|
| Mode: | REFRESH |
| Multicast Group ID | Group_ID |
| Root | Root |
| Originator | Root |
| Forwarder | 802 |
| Routing Table: | |
| FORWARD NODE LIST | (803, . . . , Root, 801, 802) |
| BACKWARD NODE LIST | ( . . . ) |
| Reconstructed Path Flag | OFF |
| Forwarding Flag | ON |
| Receptive-Inbound | Forwarder |
| Receptive-Outbound | NULL |
| Others | |

To describe the steps starting from step 734, it is now assumed that the packet received by node 803 from node 802 at step 702 is a data packet rather than the REFRESH control packet illustrated in the above exemplary table 13. Before step 734, the process determines at step 704 if the packet received by node 803 is a data packet, if it is a data packet, at step 734 it is determined if Forwarding Flag of the data packet is set to ON. If the Forwarding Flag is ON, the node receiving the data packet is an intermediate node, and therefore should forward the packet along the next best hop. In this case, the above-described step 710 executes. On the other hand, if the Forwarding Flag is OFF, the node receiving the data packet is a group member node, and therefore the packet should not be forwarded to any other nodes. At this stage, the node 803 simply receives the data packet, and waits (or "listens") for a predetermined time for more data from an upstream node (in this case node 802) at step 716. If node 803 receives a packet within the predetermined time limit determined at step 716, at step 718 the Receptive-Outbound is set to the next node, the entry timer is refreshed, and the process loops back to step 702. However, if node 803 timer expires before reception of a packet, then step 720 executes (described below).

As illustrated in FIG. 8A, the node 804, not on the FORWARD NODE LIST of any packet, will also receive broadcast control packets from both nodes 801 and 802 because it is within their broadcast ranges 805 and 806. At step 702, node 804 will receive the broadcast control messages and check their parameter settings. At step 704, it is determined if the packets received are data packets, and if they are not data packets, at step 706 it is determined if the Reconstructed Path Flag is set to ON. If the Reconstructed Path Flag is OFF, at step 708 it is determined if node 804 address is next on the node list. That is, was node 804 supposed to receive the packet? If node 804 is not on the node list, at step 714 the FORWARD NODE LIST is refreshed, the Forwarding Flag is set to OFF (there is no need to take over forwarding duties and forward message), Receptive-Inbound is set to 801, the entry timer is refreshed, and the next node on the node list is set to the first address on the node list, as the exemplary following table 14 indicates.

TABLE 14

| PARAMETER | SETTING |
|---|---|
| Mode: | REFRESH |
| Multicast Group ID | Group_ID |
| Root | Root |
| Originator | Root |
| Forwarder | 802 |
| Routing Table: | |
| FORWARD NODE LIST | (803, . . . , Root, 801, 802) |
| BACKWARD NODE LIST | ( . . . ) |
| Reconstructed Path Flag | OFF |
| Forwarding Flag | OFF |
| Receptive-Inbound | 801 |
| Receptive-Outbound | 802 |
| Others | |

At the next step 716, it is determined if node 804 overhears a packet from the next node within a time limit. If it is determined that node 804 did receive a packet within the time limit, it sets the Receptive-Outbound to the next node, and refreshes the entry timer. If, at step 716, the node 804 hears nothing within the time limit, then step 720 (described below) executes.

In general, nodes within transmission range of a multicast tree are categorized into active nodes such as nodes 801, 802, and 803, and inactive nodes such as node 804. An active node, which is a node on the critical path between a root and a group member, performs the forwarding duty. An inactive node defined as a neighbor node that is fully receptive of its upstream and downstream active nodes but not on forwarding duty, could take over the forwarding role, if necessary. The present invention detects and prevents most link breakage with the use of REFRESH control packet and the collaboration of inactive neighbor nodes. Due to inherent broadcast characteristic of the ad-hoc nodes, an inactive neighbor node (such as node 804) unavoidably overhears multicast traffic as described above. The basic principle is to have inactive neighbor nodes monitor the traffic flow of active nodes, and correct problems by taking over the forwarding duty of an active node, if required.

(II) Other Circumstances:

FIGS. 8B to 8E are exemplary illustrations of route maintenance under changing (other) circumstances, which will be described in relations to FIGS. 7A and 7B. When an inactive node (such as node 804 of FIG. 8A) fails to overhear REFRESH control packets or data packets from both its upstream and downstream active nodes (801, 802, and 803) within a time limit (at step 716 of FIG. 7A), it assumes that the local circumstances have changed, and interprets this as a possible link breakage. The local circumstance changes may for example result from node mobility, node failure, terrain blockage, etc. In general, each cause of circumstance changes requires different action(s) to preserve an established route. There are several possible cases for circumstance changes, non-limiting examples of which include, when an active node moves outside the broadcast range of its upstream node with an inactive node functioning properly (FIG. 8B), both active and inactive nodes function properly, but a terrain blockage exists (FIG. 8C), an inactive node is not functioning properly (FIG. 8D), multiple inactive nodes exist (FIG. 8E), or no inactive node exists. A node that is able to maintain its function and role is considered as operating properly.

When an inactive neighbor node notices the absence of the transmission of the active node, it assumes a link breakage and can take over the forwarding duty. In most cases, an inactive neighbor node takes basic preventive action by sending out a modified REFRESH control packet with Reconstructed Path Flag set to ON. Eventually, when a root node or a group member node receives the modified REFRESH control packet, it modifies the node list in the REFRESH control packet header accordingly. As described in detail below, the presence of such collaborative neighbor nodes prevents some link breakage problems. Therefore, by applying the collaborative discovery schemes of the present invention, the dependability of an ad-hoc network increases.

FIG. 8B is an exemplary illustration of a circumstance where an active node 802 drifts out (indicated by the arrow 808) of the broadcast range 806 of its upstream node 801, and a properly functioning inactive node 804 exists within the same broadcast range 806. In such a case, the active node 802 can no longer relay a packet from its former upstream node 801 to its downstream node 803. As illustrated and described above with respect to FIGS. 7A and 8A, although, node 804 is not on forwarding duty, it continues to overhear transmissions (at step 716) from both nodes 801 and 802. After a predetermined time, when node 804 hears from node 801, but not from node 802, node 804 assumes node 802 has drifted out of the broadcasting range 806 of node 801. When this circumstance occurs, node 804 notices the absence of the transmission of its active downstream node 803 and takes over the forwarding duty until its forwarding table entry expires. It forwards a modified REFRESH control packet to its downstream node 803, with Reconstructed Path Flag parameter of the packet set to ON. The following exemplary table 15 illustrates a typical modified REFRESH control packet parameter setting for such a circumstance.

TABLE 15

| PARAMETER | SETTING |
| --- | --- |
| Mode: | REFRESH |
| Multicast Group ID | Group_ID |
| Root | Root |
| Originator | Root |
| Forwarder | 804 |
| Routing Table: | |
| FORWARD NODE LIST | (804, 803, . . . , 801, Root) |
| BACKWARD NODE LIST | ( . . . ) |
| Reconstructed Path Flag | ON |
| Forwarding Flag | ON |
| Receptive-Inbound | 801 |
| Receptive-Outbound | NULL |
| Others | |

Therefore, before node 804 broadcasts its cached control packet, at step 720 of FIG. 7A, it replaces the first address with its own address in the node list and sets the Reconstructed Path Flag to ON. This will indicate to all nodes receiving the packet that the path has been reconstructed (modified). If there are any data packets, it will also broadcast those. In the forwarding table, the forwarding flag is set to ON, and the entry timer is refreshed. The node 804 forwards the packet until its entry timer expires.

Referring again to the exemplary Route Maintenance method illustrated in FIG. 7A, at step 702 the node 803 receives this modified REFRESH packet from node 804, and at step 704 it is determined if the packet is a data packet. If it is not, at step 706 it is determined if the Reconstructed Path Flag is ON for the REFRESH control packet. If the Reconstructed Path Flag is ON, at step 724 of FIG. 7B it is determined if node 803 is a group member or a root node and, if it is neither, at step 726 it is determined if the Forwarding Flag of the REFRESH control packet received by node 803 is ON. If it is determined that the Flag is ON, at step 730 the node 803 forwards the packet and refreshes the entry timer. If the Forwarding Flag is OFF, at step 732 the node 803 does nothing and waits. If, at step 724, it is determined that node 803 is a group member or a root node, at step 728 the node updates the refresh control packet and broadcasts it. From this point forward, the new path includes node 804, replacing node 802 that drifted out of the broadcast range 806 of node 801. Clearly, the same procedures could apply to active nodes that fail because if node 804 does not hear from the active node 802, it does not matter whether node 802 has drifted away or failed.

FIG. 8C is an exemplary illustration of a circumstance where an active node 802 and an inactive node 804 function properly, but the inactive node 804 cannot overhear transmissions 811 from node 802 due to terrain blockage 810. This exemplary circumstance may arise when, for example, the node 802 represents a mobile cell phone used by a driver of a vehicle and the car being driven moves around a mountain (the terrain 810). The cell phone 802 is still within the proper broadcast range 806 of its upstream node 801, but an inactive neighboring node 804 cannot hear node 802. In such a circumstance, the inactive node 804 assumes that the active node 802 is now out of the broadcast range 806 of the upstream active node 801. Accordingly, from the viewpoint of the active node 804, this is the same situation as described above with respect to FIG. 8B. Hence, node 804 takes over the forwarding duty by forwarding a modified REFRESH control packet, illustrated in the above exemplary table 15 until its forwarding table entry expires. However, the downstream active node 803 discards this modified control packet due to packet duplication because the node 803 also receives the same packet from node 802.

Figure 8D:
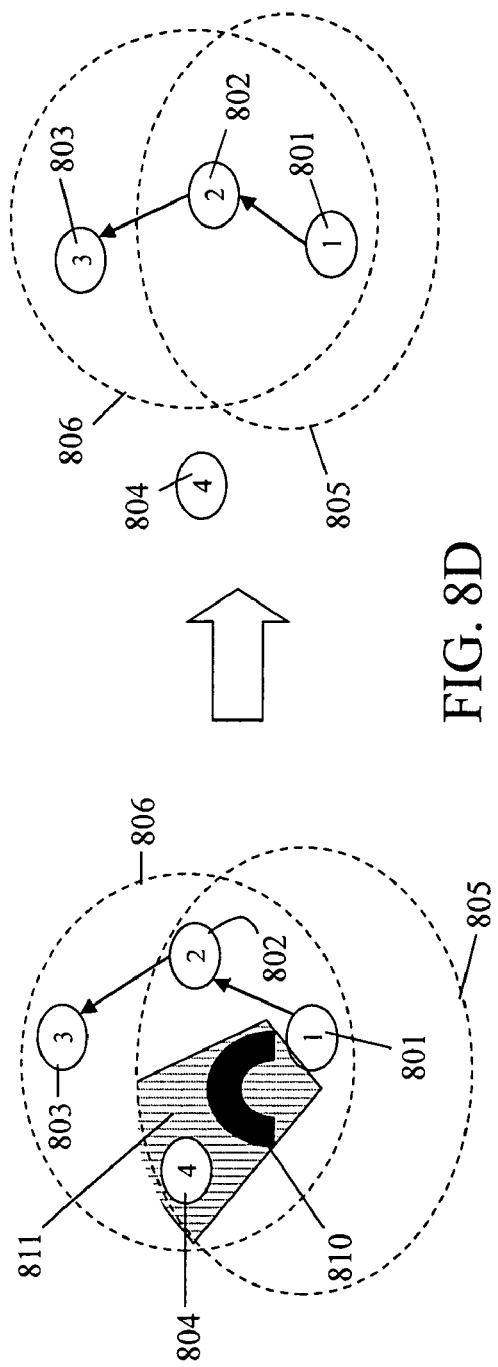

FIG. 8D is an exemplary illustration of a circumstance where a terrain 810 blocks the inactive neighbor node 804 from the active node 801, or the node 804 moves out of the broadcast range of node 801. When at step 716 of FIG. 7A, an inactive neighbor node 804 overhears nothing from upstream active node 801 due to either terrain blockage 810, or when node 804 moves out of the broadcast range 806 of the active node 801, the inactive node does not act. That is, when its forwarding table entry expires, the inactive neighbor node 804 becomes a normal node, not participating in a multicast routing. The remaining nodes 801, 802, and 803 operate as they would under normal circumstances (described above with respect to FIG. 8A).

Figure 8E:
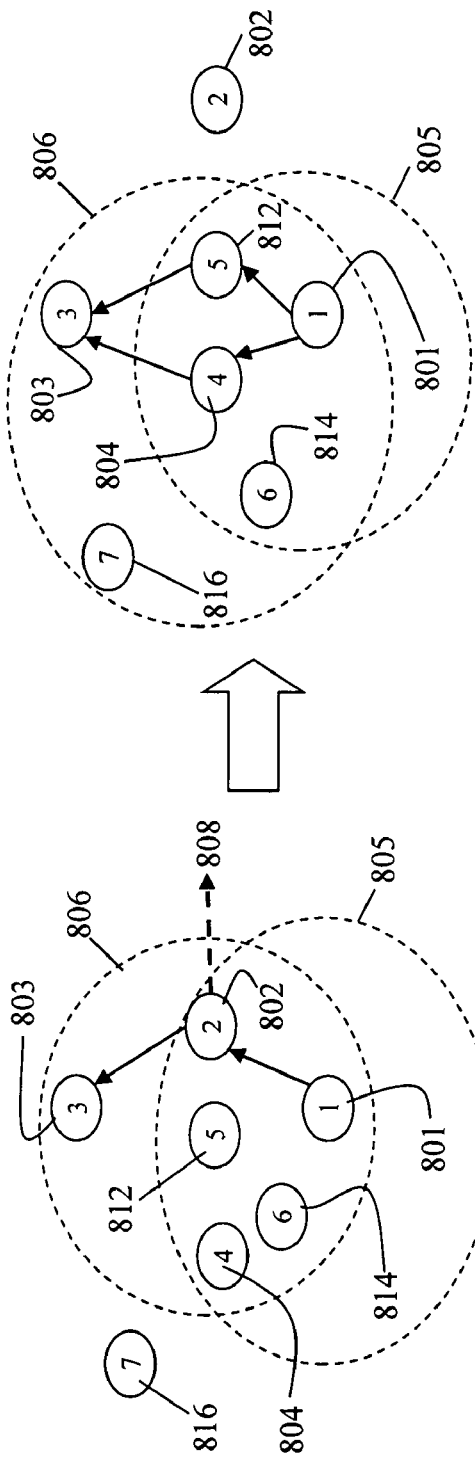

FIG. 8E is an exemplary illustration of a circumstance where multiple inactive nodes (804, 812, and 814) may exist within a broadcast range 806 of an upstream active node 801. When a selected set of inactive nodes notices the absence of an active node, it may take over the forwarding duty as described above in relations to the exemplary FIG. 8B. The criteria in selecting the acting inactive nodes can be arbitrary (e.g. random, proximity-bound, or advantages-bound). The number of selected inactive nodes varies from one to all inactive neighbor nodes, depending on the desired level of network dependability. To avoid collision, each node has a different delay setting in reacting to the circumstance. As illustrated in FIG. 8E, when noting the absence of the active node 802, selected inactive nodes 804 and 812 take over the forwarding duty as described above. The active downstream node 803 receives packets from both nodes 804 and 812, but forwards the best selected packet based on the "best forwarding path" mechanism described above. It should be noted that node 814 transmission range does not cover node 803.

An established path cannot easily be maintained for the circumstance where no inactive node exists, severing the links of a multicast tree, requiring the link recovery mechanism described below.

Figure 9:
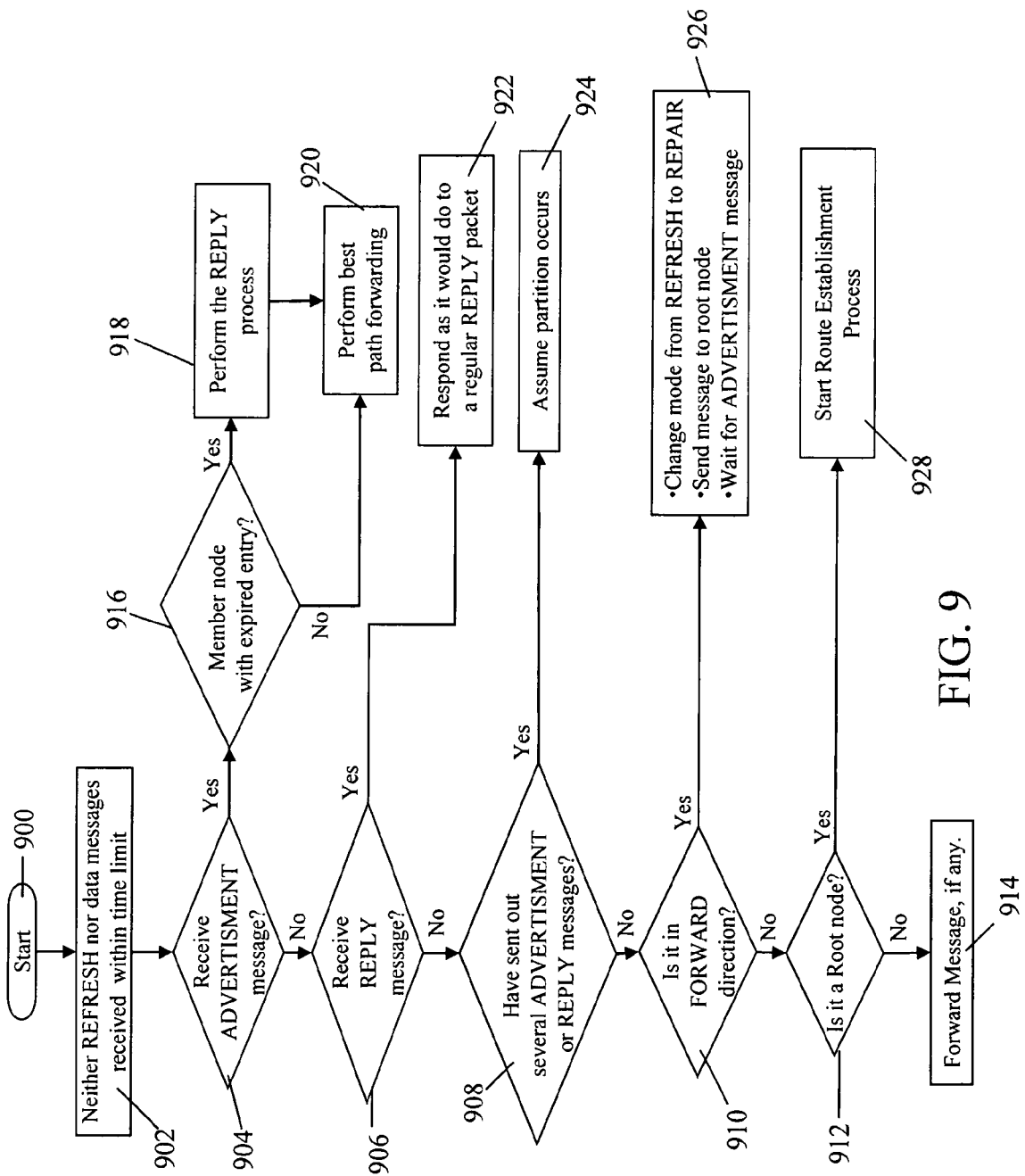
FIG. 9 is an exemplary flow diagram illustrating the required sequence of tasks for recovery of broken links within a multicast tree in accordance with the present invention.

(c) Broken Link Recovery Phase 106:

When a member node does not receive a REFRESH control packet or a data packet within a predetermined time (described above in relations to step 716 of FIG. 7A), it assumes link failure in the forward direction. FIG. 9 is a flow diagram illustrating the required sequence of tasks for Broken Link Recovery method in accordance with the present invention. The method of recovering a broken link illustrated in FIG. 9 is node-centric, describing a sequence of events for link recovery with respect to a node, and not a particular type of node (e.g. root, intermediate, or group member).

As illustrated in the flow diagram of FIG. 9, at step 902 when a node has not received a REFRESH nor a data packet within a predetermined time, at step 904 it is determined if the latest received packet was an ADVERTISEMENT. If the last received message before the time limit was an ADVERTISEMENT, at step 916 it is determined if the node is a group member node with an expired entry. Only root nodes can instantiate an ADVERTISEMENT. Hence, by default, the node receiving the ADVERTISEMENT is either a group member node or an intermediate node. If at step 916, it is determined the node is a group member node with an expired entry, the group member node at step 918 performs a REPLY process and at step 920 performs the best path forwarding (both of which were described above). If at step 916, it is determined the node is not a group member node with an expired entry, then the node, by default, is an intermediate or a group member node, and at step 920 the node performs the best path forwarding.

If it is determined at step 904 that the latest message received was not an ADVERTISEMENT, at step 906 the method determines if the message was a REPLY. If at step 906 it is determined that the last message received was a REPLY, at step 922 the node responds as it would do to a regular REPLY packet (described above). If at step 906 it is determined that the received message was not a REPLY, at step 908 it is determined if the node has sent out several ADVERTISEMENT or REPLY messages. If it is determined at step 908 that the node has forwarded several ADVERTISEMENT or REPLY messages, the method assumes at step 924 that a partition of the multicast tree has occurred. This is because each multicast tree has a single root instantiating a single ADVERTISEMENT message, requiring a single REPLY. If it is determined at step 908 the node has not forwarded several ADVERTISEMENT or REPLY messages, at step 910 it is determined if the message is in the forward direction. If so, at step 926 the node changes the message Mode from REFRESH to REPAIR, sends the message to root node, and waits for ADVERTISEMENT message. If at step 910 it is determined that the message is not in the forward direction, the method determines at step 912 if the node in question is a root node. If so, at step 928 the process of route establishment (described above) commences. If at step 912 it is determined that the node in question is not a root node, then whatever message a node has will be forwarded.

As was described, when a member node does not receive a REFRESH or data packet within a predetermined time, it assumes a link failure in the forward direction. The member node unicasts a REPAIR control packet to the root. The REPAIR control packet is a cached REFRESH control list with REPAIR Mode. Upon receiving REPAIR control packets, the root performs the route establishment process, and broadcasts an ADVERTISEMENT control packet. All nodes, including the member node with stale entry, perform the best forwarding mechanism by appending their own address to the message and forwarding the ADVERTISEMENT control packet. However, only member node with expired entry, or member node that sees a better path from the ADVERTISEMENT control packet, replies. Upon receiving a REPLY control packet, the root node performs a REFRESH process for nodes within the multicast by changing the packet Mode from REPLY to REFRESH, rotates its address to the back of the node list, and sends completed control packets out periodically. If no REPLY packets arrive after several ADVERTISEMENT broadcasts, the root node assumes that within the current domain perimeter all node members are reachable. If no REFRESH packets arrive after several REPAIR control packets sent out, a group member with expired forwarding table entry assumes that there is an unrecoverable broken link, resulting in partitioned domains. In a partitioned domain, the group member could become a root node if the group member node is satellite-based and has packets to send. The ADVERTISEMENT process starts over again in the partitioned domain.

When the broken link occurs in backward direction, a root node receives no REFRESH control packet back within a predetermined period. It starts the ADVERTISEMENT process as if it received a REPAIR control packet. The REPLY and the REFRESH processes are identical to the above mentioned.

Figure 10:
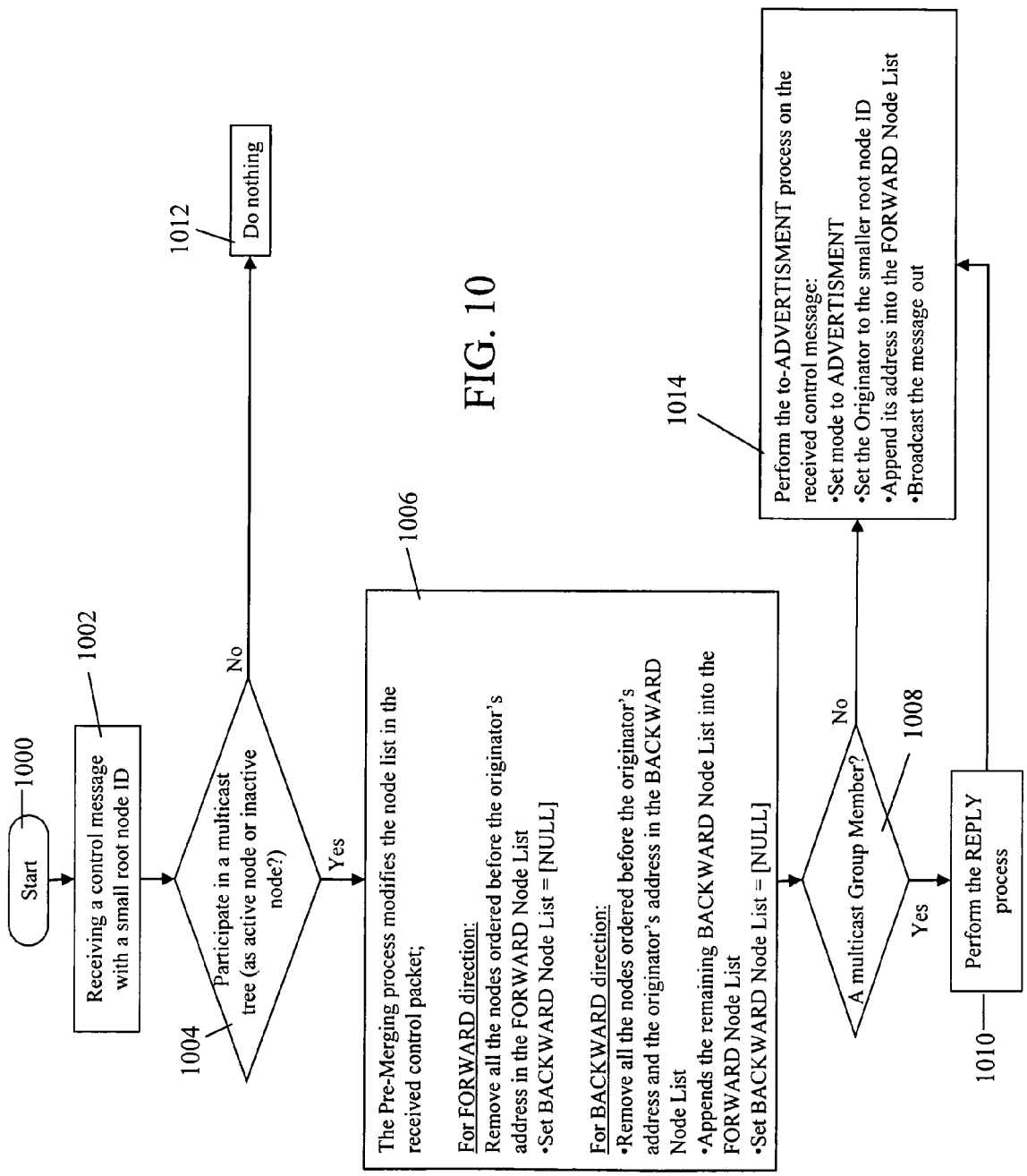
FIG. 10 is an exemplary flow diagram illustrating the required sequence of tasks for merging partitioned multicast trees of a multicast group in accordance with the present invention.

(d) Partition Merge Phase 110:

When two partitions of one multicast group roam into each other, they can merge into a larger partition. FIG. 10 is a flow diagram illustrating the required sequence of tasks for merging a partitioned multicast tree in accordance with the present invention. The method of merging illustrated in FIG. 10 is node-centric, describing a sequence of events for merging partitioned groups with respect to a node, and not a particular type of node (e.g. root, intermediate, or group member). The merge process of FIG. 10 will first be described with respect to FIG. 11A, which is an illustration of a scenario where partitions merge along a forward direction and second with respect to FIG. 11B, which is an illustration of a scenario where partitions merge along a backward direction.

(I) Partition Merge—Forward Direction

Figure 11A:
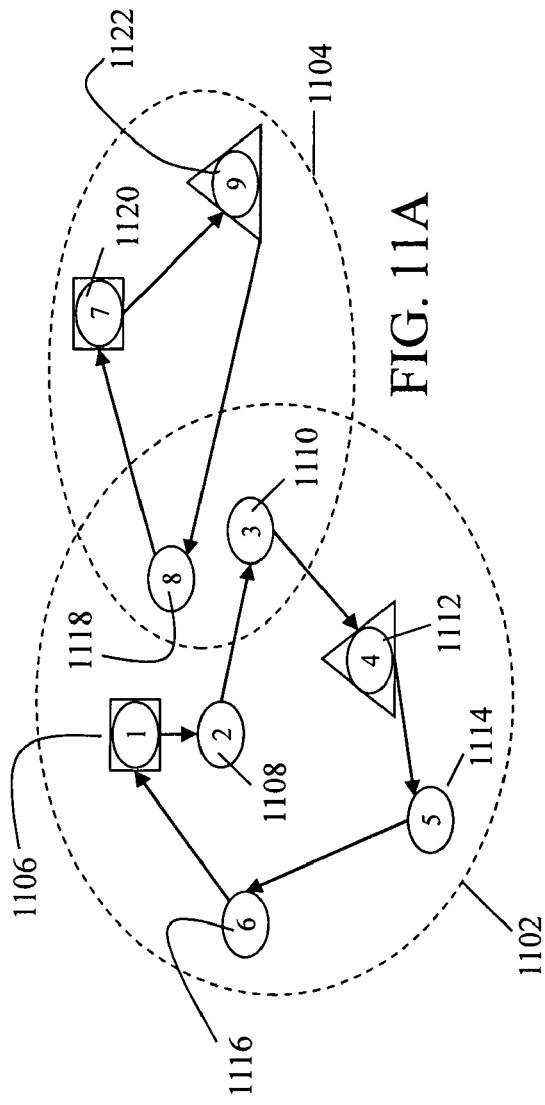
FIGS. 11A and 11B are exemplary multicast topographies of two multicast trees being merged in forward and backward directions, respectively, in accordance with the present invention.

FIG. 11A illustrates two partitioned multicast trees 1102 and 1104 of a single multicast group in the process of merging in forward direction. The first multicast tree 1102 includes a root node 1106 with its own set of nodes, including an intermediate node 1110 within the broadcast range of both multicast trees 1102 and 1104. The second multicast tree 1104 includes its own root node 1120 with its own set of nodes, including an intermediate node 1118 within the broadcast range of both multicast trees 1104 and 1102. Given that the nodes 1118 and 1110 are also within each other's broadcast range, they can receive each other's broadcast control packets. The multicast group identification (ID) parameter of both control packets will have the same group ID parameter setting because the nodes are part of the same multicast group, but partitioned due to a variety of reasons.

Upon receiving each other's packets, the intermediate nodes 1110 and 1118 commence (at step 1000) the partition merge process illustrated in FIG. 10. The following exemplary table 16 illustrates the packet transmitted by node 1110 and received by node 1118. A similar packet will also be broadcast from node 1118 and received by node 1110, but with different parameter settings such as the parameter Root being node 1120, the Originator set to node 1120, Forwarder set to 1118, and a different set of Routing Table entries commensurate with node 1118 associated multicast tree 1104 routing. The multicast group identification parameter will be the same for both packets.

TABLE 16

| PARAMETER | SETTING |
| --- | --- |
| Mode: | REFRESH |
| Multicast Group ID | Group_ID |
| Root | 1106 |
| Originator | 1106 |
| Forwarder | 1110 |
| Routing Table: | |
| FORWARD NODE LIST | (1112, 1106, 1108, 1110) |
| BACKWARD NODE LIST | (1112, 1114, 1116, 1106) |
| Reconstructed Path Flag | |
| Forwarding Flag | |
| Receptive-Inbound | |
| Receptive-Outbound | |
| Others | |

As illustrated in FIG. 10, at step 1002, both nodes receive each other's packet and, from the Group_ID parameter, determine that they belong to the same multicast group that has partitioned. As mentioned above, each multicast group must have a single root node. If the partitioned multicast trees 1102 and 1104 were to merge, a determination must therefore be made as to which of their respective root nodes 1106 or 1120 will take over as the root node for the newly merged, larger multicast tree. The manner of selection of the root node may be application-dependent based on the deployment scenario of the system, which may be a complicated procedure. It may also be simple, where the root node with a lower root node ID will be selected as the root node for the newly merged multicast tree. For the sake of simplicity and easier comprehension of this description, the present invention uses an exemplary method of selecting the root node based on its lower ID number. In this case, at step 1002 of FIG. 10, the root node 1106 (with lower number) will be selected over the root node 1120 (with the higher number) as the new root node for the merged, larger multicast tree.

At the next step 1004 of the method illustrated in FIG. 10, it is determined if the node 1118 (within the multicast tree 1104 with a higher root node ID 1120 receiving the packet illustrated as the above exemplary table 16) participates in a multicast tree. If it is determined that node 1118 does not participate in the multicast tree (in an active or an inactive capacity), then at step 1012 it does nothing, and waits. If it is determined that node 1118 is a participant in a multicast tree, at step 1006 the node commences a pre-merge process. The pre-merging process focuses on modifying the node lists of the Routing Table in the control packet header. For control packets in the forward direction (FIG. 11A), the exemplary node 1118 repeatedly removes the first address on the FORWARD NODE LIST until the first address becomes the originator, and empties the BACKWARD NODE LIST. Therefore, given that the root node 1106 of the intermediate node 1110 has the smaller root ID, it will be node 1118 that will modify its received packet as illustrated in the following exemplary table 17.

TABLE 17

| PARAMETER | SETTING |
| --- | --- |
| Mode: | REFRESH |
| Multicast Group ID | Group_ID |
| Root | 1120 |
| Originator | 1120 |
| Forwarder | 1110 |
| Routing Table: | |
| FORWARD NODE LIST | (1106, 1108, 1110) |
| BACKWARD NODE LIST | (NULL) |
| Reconstructed Path Flag | |
| Forwarding Flag | |
| Receptive-Inbound | |
| Receptive-Outbound | |
| Others | |

That is, in the FORWARD NODE LIST, it removes all the nodes ordered before the originator's address, and sets the BACKWARD NODE LIST to NULL.

After the pre-merging process is completed, the method, at step 1008, determines if the node 1118 is a multicast group member node. The group member nodes perform a REPLY process at the next step 1010 and then a "to-ADVERTISEMENT" process at step 1014. Other nodes (active and inactive non-member nodes) perform only the "to-ADVERTISEMENT" process. At step 1008 of FIG. 10, if it is determined that node 1118 is a group member node, a REPLY process is performed at step 1010, modifying the packet further as illustrated in the following exemplary table 18.

TABLE 18

| GENERIC CONTROL PACKET PARAMETER SETTINGS - TABLE 18 ||
| --- | --- |
| PARAMETER | SETTING |
| Mode: | REPLY |
| Multicast Group ID | Group_ID |
| Root | 1106 |
| Originator | 1118 |
| Forwarder | 1118 |
| Routing Table: | |
| FORWARD NODE LIST | (1106, 1108, 1110, 1118) |
| BACKWARD NODE LIST | (NULL) |
| Reconstructed Path Flag | |
| Forwarding Flag | |
| Receptive-Inbound | |
| Receptive-Outbound | |
| Others | |

That is, as illustrated in the above exemplary table 18 the node 1118 sets the packet Mode to REPLY, the Root parameter to node 1106, Originator to node 1118, and the Routing Table FORWARD NODE LIST to (1106, 1108, 1110, and 1118), and its BACKWARD NODE LIST to NULL. Hence, the general REPLY process includes changing the control Mode to REPLY, setting the originator to itself, and appending receiver node address into the FORWARD NODE LIST, placing receiver node address into the BACKWARD NODE LIST, and broadcasting the REPLY packet out. In general, at the next step 1014, the group member node(s), if any, further perform a "to-ADVERTISEMENT" process (described below) to complete the merging of the partitioned multicast group.

If, at step 1008, it is determined that node 1118 is not a member node, then at step 1014 the "to-ADVERTISEMENT" process is performed on the received control message, and is broadcast. In this exemplary case, the control packet illustrated in the exemplary table 18 above will be modified as the following exemplary table 19:

TABLE 19

| PARAMETER | SETTING |
| --- | --- |
| Mode: | ADVERTISEMENT |
| Multicast Group ID | Group_ID |
| Root | 1106 |
| Originator | 1106 |
| Forwarder | 1118 |
| Routing Table: | |
| FORWARD NODE LIST | (1106, 1108, 1110, 1118) |
| BACKWARD NODE LIST | (NULL) |
| Reconstructed Path Flag | |
| Forwarding Flag | |
| Receptive-Inbound | |
| Receptive-Outbound | |
| Others | |

As illustrated in the above exemplary table 19, the "to-ADVERTISEMENT" process includes changing the control mode to ADVERTISEMENT to put the smaller root node ID into the Originator field parameter, appending its address into the FORWARD NODE LIST, and broadcasting the ADVERTISEMENT control packet. Note that in the case illustrated in table 19, the appending of the node address 1118 into the FORWARD NODE LIST was done during the REPLY process, when the method in FIG. 10 determined that the exemplary node 1118 was a group member node. Note that node 1110 discards the ADVERTISEMENT from node 1118, and nodes 1120 and 1122 REPLY if they are group members.

(II) Partition Merge—Backward Direction

Figure 11B:
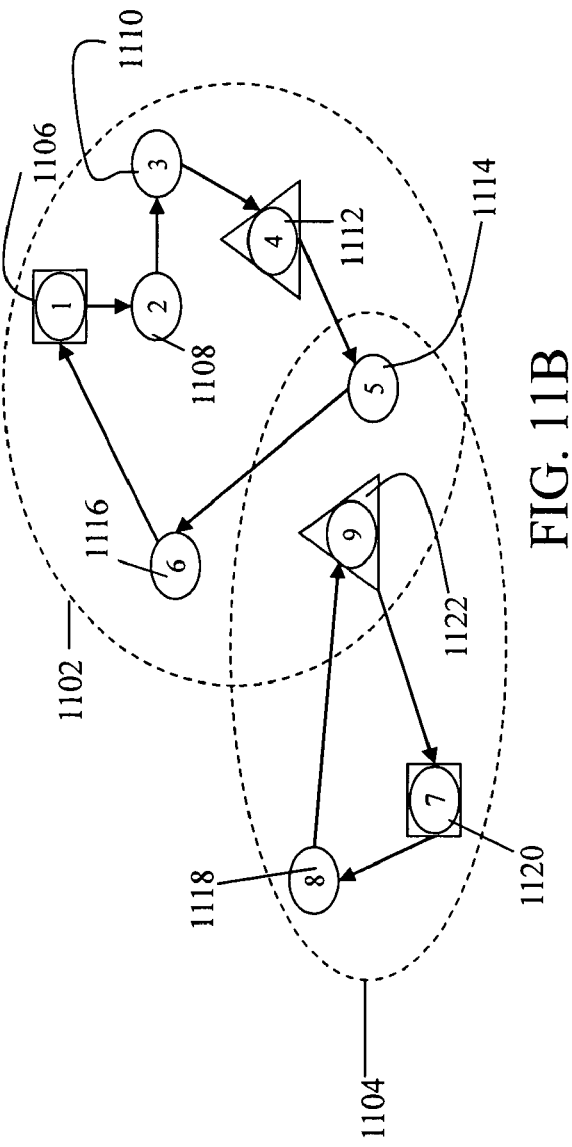

FIG. 11B illustrates the same two partitioned multicast trees 1102 and 1104 of one multicast group illustrated in FIG. 11A, but being merged in backward direction. As illustrated, the topography of each multicast tree 1102 and 1104 is the same as that illustrated in FIG. 11A. Referring to FIG. 10, the merge process commences at step 1000 when nodes 1114 and 1122 are within broadcast range of each other, each forwarding a control packet to the other. The rest of the processes will be described in relation to selection of the root node with a lower root ID number as described above in relation to FIG. 11A, which, in this case, will continue to be root node 1106 of multicast tree 1102. Therefore, the following exemplary table 20 illustrates only the packet that node 1122 (with an associated root that has higher root ID of 1120) receives from node 1114 (with an associated root with a root ID of 1106).

TABLE 20

| PARAMETER | SETTING |
| --- | --- |
| Mode: | REFRESH |
| Multicast Group ID | Group_ID |
| Root | 1106 |
| Originator | 1112 |
| Forwarder | 1114 |
| Routing Table: | |
| FORWARD NODE LIST | (1106, 1108, 1110, 1112) |
| BACKWARD NODE LIST | (1116, 1106, 1112, 1114) |

TABLE 20-continued

| PARAMETER | SETTING |
| --- | --- |
| Reconstructed Path Flag | |
| Forwarding Flag | |
| Receptive-Inbound | |
| Receptive-Outbound | |
| Others | |

The reception of control packets and the selection of a root complete the step 1002 of the merge operation illustrated in FIG. 10.

At the next step 1004, it is determined if the node 1122 receiving the packet participates in a multicast tree. If it is determined that node 1122 does not participate in the multicast tree (in an active or an inactive capacity), the node 1122 at step 1012 does nothing, and waits. If it is determined that node 1122 is a participant in a multicast tree, at step 1006, the node commences a pre-merging process. This process focuses on modifying the node lists of the Routing Table in the control packet. For control packets in the backward direction, the receiver node (with higher root ID association) repeatedly removes the first address on the BACKWARD NODE LIST until the first address is the originator, appending the remaining BACKWARD NODE LIST, excluding the originator address, to the FORWARD NODE LIST, and emptying the BACKWARD NODE LIST. The resulting pre-merging process will modify the received packet as illustrated in the following exemplary table 21.

TABLE 21

| PARAMETER | SETTING |
| --- | --- |
| Mode: | REFRESH |
| Multicast Group ID | Group_ID |
| Root | 1106 |
| Originator | 1112 |
| Forwarder | 1114 |
| Routing Table: | |
| FORWARD NODE LIST | (1106, 1108, 1110, 1112, 1114) |
| BACKWARD NODE LIST | (NULL) |
| Reconstructed Path Flag | |
| Forwarding Flag | |
| Receptive-Inbound | |
| Receptive-Outbound | |
| Others | |

After the pre-merging process is completed, at step 1008 it is determined if the node 1122 is a multicast group member node. As mentioned above, the group member nodes perform a REPLY process at the next step 1010 and then a "to-ADVERTISEMENT" process at step 1014. Other nodes (active or inactive non-member nodes) perform only the "to-ADVERTISEMENT" process. At step 1008 of FIG. 10, if it is determined that node 1122 is a group member node, a REPLY process is performed at step 1010, modifying the packet further as illustrated in the following exemplary table 22.

TABLE 22

| PARAMETER | SETTING |
| --- | --- |
| Mode: | REPLY |
| Multicast Group ID | Group_ID |
| Root | 1106 |
| Originator | 1122 |
| Forwarder | 1114 |

TABLE 22-continued

| PARAMETER | SETTING |
|---|---|
| Routing Table: | |
| FORWARD NODE LIST | (1106, 1108, 1110, 1122) |
| BACKWARD NODE LIST | (1122) |
| Reconstructed Path Flag | |
| Forwarding Flag | |
| Receptive-Inbound | |
| Receptive-Outbound | |
| Others | |

That is, as illustrated in the above table 22, the node 1122 sets the packet Mode to REPLY, the Root parameter to node 1106, Originator to node 1122, and the Routing Table FORWARD NODE LIST TO (1106, 1108, 1110, and 1122), and its BACKWARD NODE LIST to NULL. Hence, a REPLY process, at step 1010, includes changing the control Mode to REPLY, setting the originator to itself, appending its address into the FORWARD NODE LIST, placing its address into the BACKWARD NODE LIST, and broadcasting the REPLY packet.

If, at step 1008, it is determined that node 1122 is not a member node, at step 1014 the process performs a "to-ADVERTISEMENT" procedure on the received control message, which is then broadcast. In this exemplary case, the control packet illustrated in the above table 22, modifies as the following table 23 illustrates.

TABLE 23

| PARAMETER | SETTING |
|---|---|
| Mode: | ADVERTISEMENT |
| Multicast Group ID | Group_ID |
| Root | 1106 |
| Originator | 1106 |
| Forwarder | 1114 |
| Routing Table: | |
| FORWARD NODE LIST | (1106, 1108, 1110, 1112, 1114, 1122) |
| BACKWARD NODE LIST | (NULL) |
| Reconstructed Path Flag | |
| Forwarding Flag | |
| Receptive-Inbound | |
| Receptive-Outbound | |
| Others | |

As illustrated in the above exemplary table 23, the "to-ADVERTISEMENT" process includes changing the control mode to ADVERTISEMENT to put the smaller root node ID into the Originator field parameter, append its address to the FORWARD NODE LIST, and to broadcast the ADVERTISEMENT control packet. Note that in the case illustrated in the above exemplary table 23, the appending of the node address 1122 into the FORWARD NODE LIST was done during the REPLY process, when at step 1008 of FIG. 10 it was determined that the exemplary node 1122 is a group member node. Note that node 1114 discards the ADVERTISEMENT packet from node 1122, and nodes 1120 and 1118 REPLY if they are group members.

Although, the present invention has been described in the language specific to structural features and or methodological steps, it is to be understood that the present invention, defined in the appended claims, is not necessarily limited to the specific features or steps described. Rather, the specific features and steps are disclosed as preferred forms of implementing the claimed invention.

What is claimed is:

1. A method for collaborative multicast routing, comprising:
    multicasting in a hybrid, multi-tiered, heterogeneous mobile wireless network using a control packet to uniformly manage multicasting operations;
    establishing a multicast route;
    maintaining the multicast route;
    if it is determined that a link is severed within the multicast route, recovering the severed link using local communication units;
    if it is determined that a partition has occurred in a multicast group, merging partitioned multicast trees of the multicast group using local communication units; and
    wherein the control packet comprises:
        a mode parameter for identifying a purpose of the packet;
        a multicast group identification parameter for allowing the communication unit to determine if the communication unit belongs to the multicast group;
        a source parameter for identifying the source;
        an Originator parameter for identifying the originator of the packet;
        a Forwarder parameter for identifying the forwarder of the packet;
        a Routing Table, comprising a FORWARD NODE LIST for identifying the communication units traversed by the control packet along the forward direction from the source to destination, and a BACKWARD NODE LIST for identifying the communication units traversed by the control packet along the backward direction from the destination to source;
        a Reconstructed Flag parameter for identifying if the path established has been reconstructed;
        a Forwarding Flag parameter for determining if a packet should be forwarded;
        a Receptive-Inbound parameter for identifying transmission of a signal from the communication unit; and
        a Receptive-Outbound parameter for identifying the reception of a signal from the communication unit.

2. The method for collaborative multicast routing as set forth in claim 1, wherein the hybrid, multi-tiered, heterogeneous mobile wireless network comprises both satellite and land based communication units.

3. The method for collaborative multicast routing as set forth in claim 1, wherein establishing the multicast route is completed in a single round trip path of the control packet traversing in a forward direction from a source to destination and in a backward direction from destination to source.

4. The method for collaborative multicast routing as set forth in claim 1, wherein maintaining the multicast route is done by a source communication unit forwarding the control packet to all destination communication units to maintain active status.

5. The method for collaborative multicast routing as set forth in claim 1, wherein recovering of the multicast tree with broken links are done by local communication units using the control packet.

6. The method for collaborative multicast routing as set forth in claim 1, wherein merging of the multiple multicast tree partitions of a multicast group into a larger multicast tree are done by local communication units using the control packet.

7. A computer program product for collaborative multicast routing, the computer program product comprising a non-transitory computer-readable medium having computer program instructions stored therein for causing a computer to perform operations of:

multicasting in a hybrid, multi-tiered, heterogeneous mobile wireless network using a control packet to uniformly manage multicasting operations;
establishing a multicast route;
maintaining the multicast route;
if it is determined that a link is severed within the multicast route, recovering the severed link using local communication units;
if it is determined that a partition has occurred in a multicast group, merging partitioned multicast trees of the multicast group using local communication units; and
wherein the control packet comprises:
a mode parameter for identifying a purpose of the packet;
a multicast group identification parameter for allowing the communication unit to determine if the communication unit belongs to the multicast group;
a source parameter for identifying the source;
an Originator parameter for identifying the originator of the packet;
a Forwarder parameter for identifying the forwarder of the packet;
a Routing Table, comprising a FORWARD NODE LIST for identifying the communication units traversed by the control packet along the forward direction from the source to destination, and a BACKWARD NODE LIST for identifying the communication units traversed by the control packet along the backward direction from the destination to source;
a Reconstructed Flag parameter for identifying if the path established has been reconstructed;
a Forwarding Flag parameter for determining if a packet should be forwarded;
a Receptive-Inbound parameter for identifying transmission of a signal from the communication unit; and
a Receptive-Outbound parameter for identifying the reception of a signal from the communication unit.

8. The computer program product as set forth in claim 7, wherein the hybrid, multi-tiered, heterogeneous mobile wireless network comprises both satellite and land based communication units.

9. The computer program product as set forth in claim 7, wherein establishing the multicast route is completed in a single round trip path of the control packet traversing in a forward direction from a source to destination and in a backward direction from destination to source.

10. The computer program product as set forth in claim 7, wherein maintaining the multicast route is done by a source communication unit forwarding the control packet to all destination communication units to maintain active status.

11. The computer program product as set forth in claim 7, wherein recovering of the multicast tree with broken links are done by local communication units using the control packet, and wherein merging of the multiple multicast tree partitions of a multicast group into a larger multicast tree are done by local communication units using the control packet.

12. A communication unit for collaborative multicast routing, comprising:
a processor and a memory, the memory including instructions stored therein such that upon execution of the instructions, the processor performs operations of: multicasting in a hybrid, multi-tiered, heterogeneous mobile wireless network using a control packet to uniformly manage multicasting operations;
establishing a multicast route;
maintaining the multicast route;
if it is determined that a link is severed within the multicast route, a local communication unit recovering the severed link;
if it is determined that a partition has occurred in a multicast group, the local communication unit merging partitioned multicast trees of the multicast group; and
wherein the control packet comprises:
a Mode parameter for identifying a purpose of the packet;
a multicast Group Identification parameter for allowing the communication unit to determine if the communication unit belongs to the multicast group;
a Source parameter for identifying the source;
an Originator parameter for identifying the originator of the packet;
a Forwarder parameter for identifying the forwarder of the packet;
a Routing Table, comprising a FORWARD NODE LIST for identifying the communication units traversed by the control packet along the forward direction from the source to destination, and a BACKWARD NODE LIST for identifying the communication units traversed by the control packet along the backward direction from the destination to source;
a Reconstructed Flag parameter for identifying if the path established has been reconstructed;
a Forwarding Flag parameter for determining if a packet should be forwarded;
a Receptive-Inbound parameter for identifying transmission of a signal from the communication unit; and
a Receptive-Outbound parameter for identifying the reception of a signal from the communication unit.

13. The communication unit as set forth in claim 12, wherein the hybrid, multi-tiered, heterogeneous mobile wireless network comprises both satellite and land based communication units.

14. The communication unit as set forth in claim 12, wherein establishing the multicast route is completed in a single round trip path of the control packet traversing in a forward direction from a source to destination and in a backward direction from destination to source.

15. The communication unit as set forth in claim 12, wherein maintaining the multicast route is done by a source communication unit forwarding the control packet to all destination communication units to maintain active status.

16. The communication unit as set forth in claim 12, wherein recovering of the multicast tree with broken links are done by local communication units using the control packet.

17. The communication unit as set forth in claim 12, wherein merging of the multiple multicast tree partitions of a multicast group into a larger multicast tree are done by local communication units using the control packet.

* * * * *